(12) United States Patent
Kariya et al.

(10) Patent No.: US 8,360,766 B2
(45) Date of Patent: Jan. 29, 2013

(54) INJECTION MOLDING MACHINE AND INJECTION MOLDING METHOD

(75) Inventors: Toshihiko Kariya, Nagoya (JP); Satoshi Miyagawa, Nagoya (JP); Naoki Toda, Nagoya (JP); Gen Hamada, Nagoya (JP); Michitaka Hattori, Nagoya (JP)

(73) Assignee: Mitsubishi Heavy Industries Plastic Technology Co., Ltd., Nagoya-shi, Aichi (JP)

( * ) Notice: Subject to any disclaimer, the term of this patent is extended or adjusted under 35 U.S.C. 154(b) by 174 days.

(21) Appl. No.: 12/991,264

(22) PCT Filed: Aug. 5, 2009

(86) PCT No.: PCT/JP2009/003754
§ 371 (c)(1),
(2), (4) Date: Nov. 5, 2010

(87) PCT Pub. No.: WO2010/050099
PCT Pub. Date: May 6, 2010

(65) Prior Publication Data
US 2011/0049762 A1    Mar. 3, 2011

(30) Foreign Application Priority Data
Oct. 28, 2008    (JP) .................. 2008-276604

(51) Int. Cl.
*B29C 45/12*    (2006.01)
*B29C 45/73*    (2006.01)
*B29C 45/78*    (2006.01)
(52) U.S. Cl. .................. 425/144; 264/40.6; 264/328.16; 425/548; 425/552

(58) Field of Classification Search .................. 264/40.6, 264/328.16; 425/143, 144, 160, 162, 547, 425/548, 552
See application file for complete search history.

(56) References Cited

U.S. PATENT DOCUMENTS 4,449,913 A * 5/1984 Krishnakumar et al. ...... 425/548
5,411,686 A * 5/1995 Hata ............................. 264/40.6
5,589,114 A * 12/1996 Evans .......................... 264/40.6
(Continued)

FOREIGN PATENT DOCUMENTS
JP    51-022759 B    2/1976
JP    55-154121 U    11/1980
(Continued)

OTHER PUBLICATIONS
International Search Report of PCT/JP2009/003754, mailing date Oct. 13, 2009.
(Continued)

*Primary Examiner* — Jill Heitbrink
(74) *Attorney, Agent, or Firm* — Westerman, Hattori, Daniels & Adrian, LLP

(57) ABSTRACT

An injection molding machine is provided with a mold forming a cavity into which a resin is injected, a liquid supplying device which supplies a liquid continuously to an internal flow channel of the mold during a preparation period prior to injection of the resin and an injection period in which the resin after the preparation period is injected, an electricity supplying device which supplies electricity to an electric heater arranged on the mold at least during a part of the preparation period, thereby heating the mold, and a controller which carries out a predetermined procedure for making different a temperature of a liquid in the internal flow channel between the preparation period and the injection period.

18 Claims, 9 Drawing Sheets

U.S. PATENT DOCUMENTS

| | | | |
|---|---|---|---|
| 2004/0222566 A1* | 11/2004 | Park | 264/338 |
| 2009/0115104 A1* | 5/2009 | Anbarasu et al. | 264/319 |
| 2009/0212464 A1* | 8/2009 | Kang | 264/328.14 |
| 2009/0220723 A1* | 9/2009 | Jaderberg et al. | 428/64.2 |
| 2010/0159061 A1* | 6/2010 | Chen et al. | 425/547 |
| 2011/0059201 A1* | 3/2011 | Jong et al. | 425/547 |
| 2011/0101565 A1* | 5/2011 | Cho | 264/319 |

FOREIGN PATENT DOCUMENTS

| | | |
|---|---|---|
| JP | 60-013821 B2 | 4/1985 |
| JP | 5-084747 A | 4/1993 |
| JP | 2537231 B2 | 9/1996 |
| JP | 2559651 B2 | 12/1996 |
| JP | 2006-110905 A | 4/2006 |
| JP | 2006-256247 A | 9/2006 |
| JP | 2008-080670 A | 4/2008 |

OTHER PUBLICATIONS

Written Opinion of PCT/JP2009/003754, mailing date Oct. 13, 2009.
Japanese Office Action dated May 8, 2012, issued in corresponding Japanese Patent Application No. 2010-535623.

* cited by examiner

INJECTION MOLDING MACHINE AND INJECTION MOLDING METHOD

TECHNICAL FIELD

The present invention relates to an injection molding machine and an injection molding method.

Priority is claimed on Japanese Patent Application No. 2008-276604, filed on Oct. 28, 2008, the contents of which are incorporated herein by reference.

BACKGROUND ART

In steps of producing plastic products, there are used, for example, injection molding machines disclosed in Patent Documents 1 and 2 given below. The injection molding machines are provided with a mold for forming a cavity into which a thermoplastic resin is injected. The resin is injected into the cavity and the mold is cooled, causing the resin is solidified to produce plastic products.

PRIOR ART DOCUMENTS

Patent Document

[Patent Document 1] Japanese Published Examined Patent Application, Publication No. Sho-60-13821
[Patent Document 2] Japanese Published Unexamined Patent Application, Publication No. 2006-110905

SUMMARY OF THE INVENTION

Problems to be Solved by the Invention

In an injection molding machine, where, for example, where an electric heater is used to heat a mold and a cooling liquid is supplied to an internal flow channel of the mold, it is likely that there is found a decreased performance of an injection molding machine such as an increased energy amount used by the injection molding machine or deterioration in the quality of molded articles, depending on a heating temperature of the electric heater and the liquid flowing through the internal flow channel. As a result, there is a possibility that plastic products may be produced less productivity or deteriorated in quality.

An object of the present invention is to provide an injection molding machine capable of suppressing the decreased performance. Another object of the present invention is to provide an injection molding method capable of suppressing deterioration in the quality of molded articles to be formed.

Means for Solving the Problems

According to a first aspect of the present invention, there is provided an injection molding machine having a mold which forms a cavity into which a resin is injected, a liquid supplying device which continuously supplies a liquid to an internal flow channel of the mold during a preparation period prior to injection of the resin and an injection period in which the resin after the preparation period is injected, an electricity supplying device which supplies electricity to an electric heater arranged on the mold at least during a part of the preparation period to heat the mold, and a controller which carries out a predetermined procedure for making different the temperature of the liquid in the internal flow channel between the preparation period and the injection period.

It is noted that in the present description, the term "injection period" means "period including a step of injecting a resin and a step of cooling and solidifying the injected resin."

According to the first aspect of the present invention, during the preparation period in which the electric heater is used to heat the mold and the injection period in which the resin is injected into the cavity, the liquid is continuously supplied to the internal flow channel of the mold and also the liquid in the internal flow channel is made to be different in temperature between the preparation period and the injection period. Therefore, where the electric heater is used to heat the mold and also the liquid is supplied to the internal flow channel of the mold, it is possible to suppress increases in the amount of energy used by an injection molding machine or increases in the loads of the devices. Therefore, it is possible to suppress the decreased performance of the injection molding machine and also suppress the decreased productivity of making plastic products.

It is possible that the injection molding machine, that is, the first aspect of the present invention, is provided with a flow rate adjusting device which is controlled by the controller and capable of adjusting the amount of liquid supplied per unit time to the internal flow channel. In this case, the controller is able to carry out a procedure for changing the amount of liquid supplied to the internal flow channel between the preparation period and the injection period as a predetermined procedure. Electricity is supplied to the electric heater to change the amount of liquid supplied between the preparation period and the injection period, by which it is possible to make different the temperature of the liquid in the internal flow channel between the preparation period and the injection period.

It is possible that the injection molding machine of the first aspect of the present invention is provided with a temperature adjusting device which is controlled by the controller and capable of adjusting the temperature of the liquid before supplying it to the internal flow channel. In this case, the controller is able to carry out a procedure for changing the temperature of the liquid before supplying it to the internal flow channel between the preparation period and the injection period as a predetermined procedure. The liquid which is supplied is changed in temperature between the preparation period and the injection period, by which it is possible to make different the temperature of the liquid in the internal flow channel between the preparation period and the injection period.

In the first aspect of the present invention, the controller carries out a predetermined procedure in such a manner that the temperature of the liquid during the preparation period is made higher than the temperature of the liquid during the injection period. Thereby, it is possible that a procedure for preheating the mold (preheating procedure) during the preparation period is carried out smoothly prior to the injection period. In preheating the mold, the temperature of the liquid during the preparation period is made higher, by which, for example, the mold can be preheated smoothly without excessively increasing electricity to be supplied from the electricity supplying device to the electric heater. In other words, it is possible to suppress the fact that the liquid supplied to the internal flow channel prevents a preheating procedure by use of the electric heater. Therefore, it is possible to suppress increases in the amount of energy used by the injection molding machine including the electricity supplying device or increases in the loads of the devices.

In the first aspect of the present invention, it is desirable that the temperature of the liquid in the internal flow channel during the preparation period is adjusted to be equal to or lower than a boiling point of the liquid and also to be equal to or higher than the target temperature of the mold during the injection period, while the temperature of the liquid in the internal flow channel during the injection period is adjusted to be equal to or lower than the target temperature of the mold during the injection period. During the preparation period, it is desirable that the liquid is increased in temperature so as not to prevent the preheating procedure by the electric heater. However, when the temperature of the liquid is at a boiling point or higher, there is an increased likelihood that high-temperature steam may develop. When the high-temperature steam leaks out from the internal flow channel, the injection molding machine is greatly influenced on its periphery. A seal mechanism for suppressing leakage of steam is in general complicated in structure or higher in cost. Further, the seal mechanism for suppressing the leakage of steam is required for heat resistance. Therefore, a liquid is continuously supplied to the internal flow channel and also kept low in temperature so as to be equal to or lower than a boiling point, by which it is possible to suppress generation of steam. Still further, the temperature of the liquid during the preparation period is made equal to or higher than the target temperature of the mold at least during the injection period, by which the electric heater is able to smoothly carry out the preheating procedure. In addition, the temperature of the liquid is adjusted during the injection period so as to be equal to or lower than the target temperature of the mold during the injection period, thus making it possible to efficiently solidify a thermoplastic resin.

The temperature of the liquid in the internal flow channel during the preparation period can be adjusted, for example, to be equal to or lower than the target temperature of the mold during the preparation period and also to be equal to or higher than the target temperature of the mold during the injection period. Thereby, it is possible to smoothly carry out the preheating procedure of the mold during the preparation period. For example, where the target temperature of the mold during the preparation period is lower than a boiling point of the liquid, it is possible to suppress generation of steam to a greater extent.

It is noted that the target temperature of the mold during the injection period is a temperature at which a resin injected into a cavity can be solidified. Temperatures at which the resin injected into the cavity can be solidified include at least one of a temperature equal to or lower than that at which a crystalline resin will crystallize and a temperature equal to or lower than that at which a non-crystalline resin will undergo thermal deformation.

Further, it is possible that the injection molding machine of the first aspect of the present invention is provided with a temperature sensor capable of detecting the temperature of the liquid in the internal flow channel. Thereby, on the basis of detection results of the temperature sensor, the controller is able to carry out accurately a predetermined procedure for making different the temperature of the liquid in the internal flow channel between the preparation period and the injection period.

It is also possible that the injection molding machine of the first aspect of the present invention is provided with a timer capable of measuring the time of the preparation period and the injection period. Thereby, on the basis of measurement results of the timer, the controller is able to accurately carry out a predetermined procedure for making different the temperature of the liquid in the internal flow channel between the preparation period and the injection period.

In the first aspect of the present invention, where the electricity supplying device starts supplying electricity to the electric heater at a first time point of the preparation period, the controller is able to start a predetermined procedure for increasing the temperature of the liquid in the internal flow channel at a second time point prior to the first time point of the preparation period. At a time point prior to supplying electricity to the electric heater, the liquid to be supplied is decreased in the amount or increased in temperature, by which electricity consumption of the electric heater can be suppressed during the preparation period to efficiently carry out the preheating procedure of the mold. There is also a possibility that it takes time before an amount of liquid supplied per actual unit time from the liquid supplying device reaches a target value or it takes time before the temperature of the liquid to be supplied reaches a target value. That is, a time lag may occur by the time the state of the liquid to be supplied changes into a target state. Therefore, with the time lag taken into account, timing (second time point) is set for starting a predetermined procedure for increasing the temperature of the liquid in the internal flow channel, thus making it possible to efficiently carry out the preheating procedure of the mold.

Further, in the first aspect of the present invention, where the electricity supplying device halts electricity supplied to the electric heater at a third time point of the preparation period, the controller is able to start a predetermined procedure for decreasing the temperature of the liquid in the internal flow channel at a fourth time point prior to the third time point in the preparation period. Where the electricity supplied to the electric heater is halted during the preparation period, immediately after the electricity supplied is halted, a situation may develop in which the mold keeps increasing in temperature or does not immediately decrease in temperature. In other words, there is a possibility that immediately after the electricity supplied to the electric heater is halted during the preparation period, the mold temperature may not immediately approach the desired temperature thereof during the injection period. There is also a possibility that when the preparation period is shifted to the injection period, it takes time before an amount of liquid supplied per actual unit time from the liquid supplying device reaches a target value or it takes time before the temperature of the liquid to be supplied reaches a target value. That is, when the preparation period is shifted to the injection period, until the mold is in a target state or the state of the liquid to be supplied is changed into a target state, a time lag may occur. Therefore, with the time lag taken into account, timing (fourth time point) is set for starting a predetermined procedure for decreasing the temperature of the liquid in the internal flow channel, thus making it possible to smoothly shift from the preparation period to the injection period.

It is possible that the injection molding machine of the first aspect of the present invention has a supply channel which is connected to one end of the internal flow channel and through which a liquid supplied from the liquid supplying device flows. The supply channel includes a first supply channel formed inside a first member connected to the mold and a second supply channel formed inside a second member connected to the first member. It is also possible that the injection molding machine is provided with seal members arranged respectively between the mold and the first member as well as between the first member and the second member to be capable of suppressing leakage of the liquid. Since the seal members suppress leakage of the liquid, it is possible to suppress an influence on the periphery of the injection molding machine.

Further, it is possible that the injection molding machine of the first aspect of the present invention has a recovery flow channel which is connected to the other end of the internal flow channel and through which a liquid discharged from the internal flow channel flows. The recovery flow channel is provided with a first recovery flow channel formed inside the first member connected to the mold and a second recovery flow channel formed inside the second member connected to the first member. It is also possible that the injection molding machine is provided with seal members arranged respectively between the mold and the first member as well as between the first member and the second member, thereby suppressing leakage of the liquid. Since the seal members suppress leakage of the liquid, it is possible to suppress an influence on the periphery of the injection molding machine.

It is possible that the injection molding machine of the first aspect of the present invention has a first mold arranged on a first face of the first member and a second mold arranged on a second face of the first member on the opposite side of the first face. Then, the first member and the second member rotate, thus making it possible to produce molded articles in various shapes.

The injection molding machine is provided, for example, with a third mold arranged on one side with respect to the first member and a fourth mold arranged on the other side with respect to the first member. Thereby, the first member is rotated, allowing one side of the first mold and that of the second mold to oppose the third mold and allowing the other side of the first mold and that of the second mold to oppose the fourth mold, thus making it possible to produce two molded articles at the same time.

Further, there is formed a first cavity into which a first resin is injected between one side of the first mold and that of the second mold and the third mold, and there is formed a second cavity into which a second resin is injected between the other side of the first mold and that of the second mold and the fourth mold. Thereby, it is possible to produce, for example, a plastic product (two-material molded article) in which different materials and/or different colors are combined.

According to a second aspect of the present invention, there is provided an injection molding method which includes a procedure for continuously supplying a liquid to an internal flow channel formed inside a mold during a preparation period prior to injection of a resin into a cavity formed in the mold, and during an injection period in which the resin after the preparation period is injected, and a procedure for heating the mold at least during a part of the preparation period, thereby making different the temperature of the liquid in the internal flow channel between the preparation period and the injection period.

According to the second aspect of the present invention, during the preparation period in which the mold is heated and the injection period in which the resin is injected into the cavity, the liquid is continuously supplied to the internal flow channel of the mold and also the temperature of the liquid in the internal flow channel is made to be different between the preparation period and the injection period. Therefore, when the mold is heated and the liquid is also supplied to the internal flow channel of the mold, it is possible to suppress an increase in the amount of energy used by an injection molding machine or increases in the loads of the devices and also suppress the decreased productivity of making plastic products.

Effects of the Invention

According to the present invention, it is possible to suppress the decreased performance of the injection molding machine. Further, according to the present invention, it is possible to suppress deterioration in the quality of molded articles.

MODE FOR CARRYING OUT THE INVENTION

Figure 1:
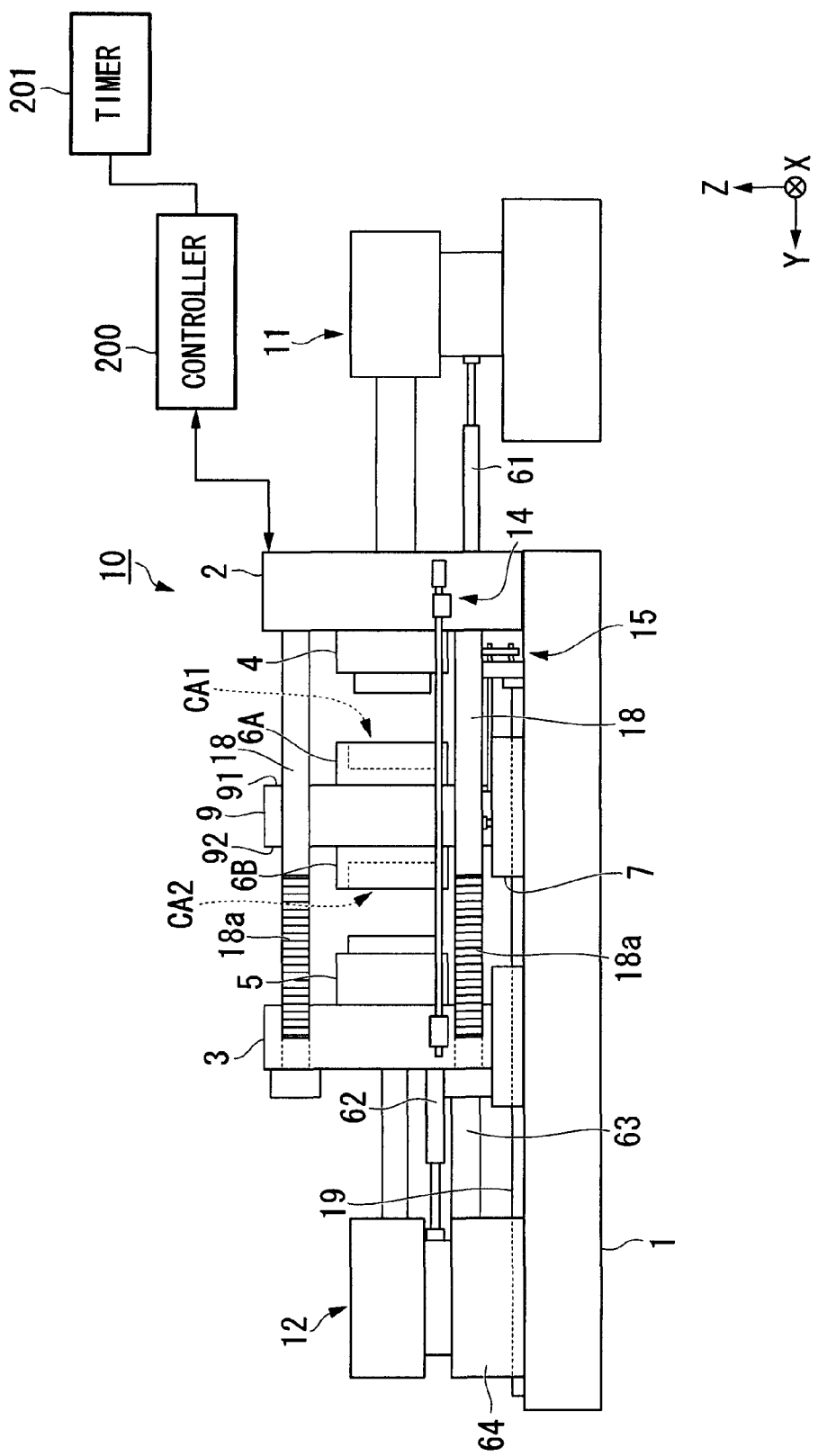
FIG. 1 is a side elevational view showing one example of an injection molding machine related to the first embodiment.

Hereinafter, an explanation will be made for embodiments of the present invention by referring to the drawings. In the explanation given below, there are set XYZ orthogonal coordinates and a positional relationship of each part will be explained by referring to the XYZ orthogonal coordinates. A predetermined direction within a horizontal plane is given as an X-axis direction, a direction orthogonal to the X-axis direction within the horizontal plane is given as a Y-axis direction, and a direction (perpendicular direction or vertical direction) orthogonal respectively to the X-axis direction and the Y-axis direction is given as a Z-axis direction. Further, rotating (inclined) directions around the X axis, the Y axis and the Z axis are respectively given as θX, θY and θZ directions.

The First Embodiment

An explanation will be made for the first embodiment. FIG. 1 is a view showing one example of an injection molding machine 10 related to the first embodiment. In the present embodiment, an explanation will be made by exemplifying a case where the injection molding machine 10 is a two-material molding injection molding machine which is provided with a first cavity (primary-side cavity) CA1 and a second cavity (secondary-side cavity) CA2 and capable of producing a plastic product in combination with different materials and/or different colors.

In FIG. 1, the injection molding machine 10 is provided with a base member 1, a fixed die plate 2 arranged on the base member 1 to support a fixed-side mold 4, a rotating die plate 9 arranged on the base member 1 to support a rotating mold 6A and a rotating mold 6B, a movable die plate 3 arranged on the base member 1 to support a movable-side mold 5, a first injection unit 11 capable of supplying a first resin to the fixed-side mold 4, a second injection unit 12 capable of supplying a second resin to the movable-side mold 5, a nozzle touch cylinder 61 for coupling the first injection unit 11 with the fixed die plate 2, a nozzle touch cylinder 62 for coupling the second injection unit 12 with the movable die plate 3, a controller 200 for controlling an overall procedure of the injection molding machine 10, and a timer 201 connected to the controller 200 and capable of measuring time.

The rotating die plate 9 is arranged between the fixed die plate 2 and the movable die plate 3. The rotating die plate 9 is supported by a rotating member 7 arranged on the base member 1. The rotating die plate 9 is arranged on the base member 1 via the rotating member 7. The second injection unit 12 is supported by a moving member 64 arranged on the base member 1. The second injection unit 12 is arranged on the base member 1 via the moving member 64. The moving member 64 is coupled with the fixed die plate 3 via a coupling member 63.

The injection molding machine 10 is also provided with a guide member 19 arranged on the base member 1. The guide member 19 guides the rotating member 7, the movable die plate 3 and the moving member 64. The rotating member 7 for supporting the rotating die plate 9 is guided by the guide member 19 and movable in the Y-axis direction on the base member 1. The movable die plate 3 is guided by the guide member 19 and movable in the Y-axis direction. The moving member 64 for supporting the second injection unit 12 is guided by the guide member 19 and is movable in the Y-axis direction.

Figure 2:
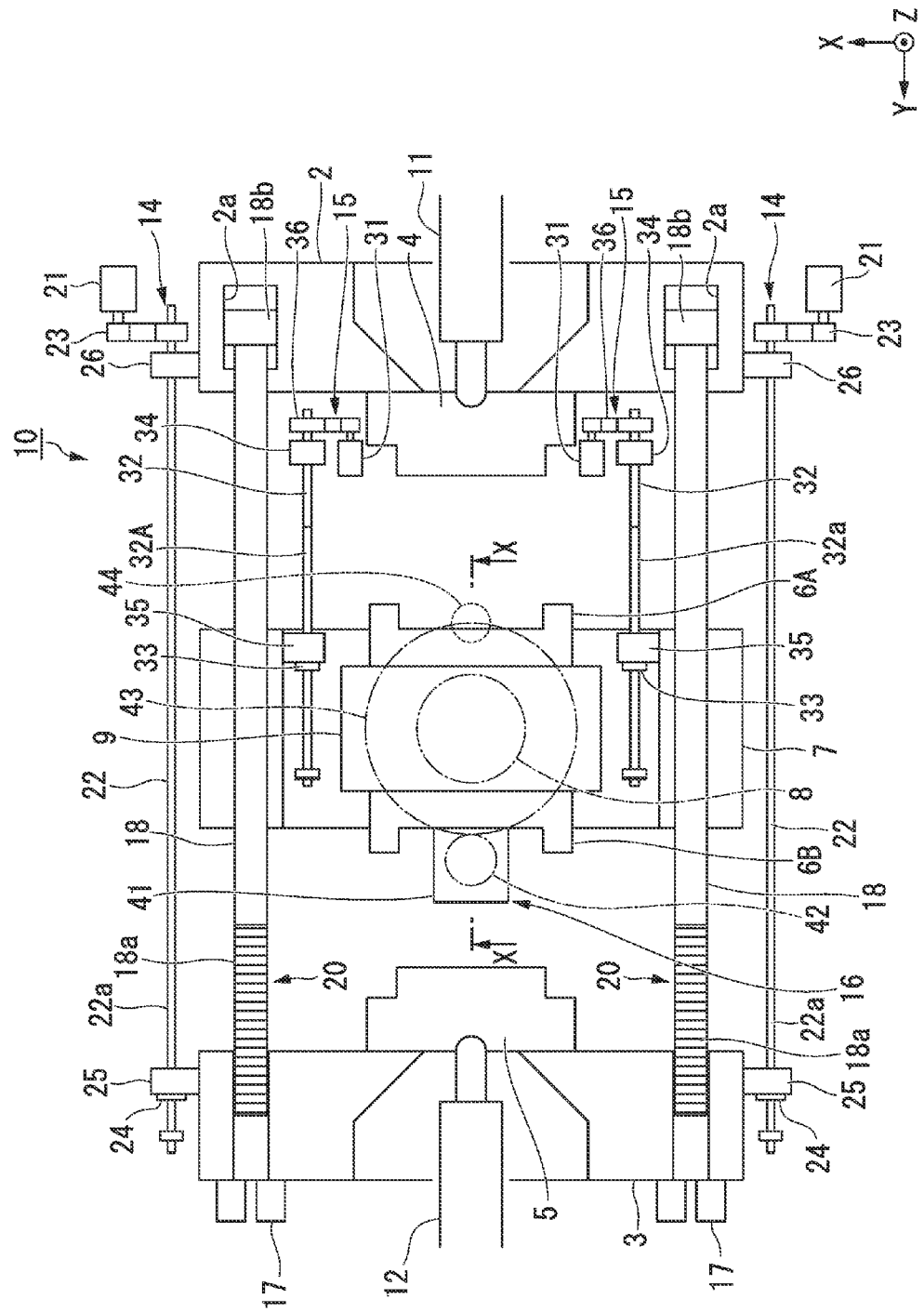
FIG. 2 is a plan view showing one example of the injection molding machine related to the first embodiment.

FIG. 2 is a view which provides an overhead view of the vicinities of the fixed die plate 2, the movable die plate 3 and the rotating die plate 9. In FIG. 2, the injection molding machine 10 is provided with a movable die plate opening/closing device 14 capable of moving the movable die plate 3 in the Y-axis direction, a rotating die plate opening/closing device 15 capable of moving the rotating die plate 9 in the Y-axis direction and a rotating die plate rotating device 16 capable of rotating the rotating die plate 9 in the θZ direction.

The movable die plate opening/closing device 14 allows the movable die plate 3 to move in the Y-axis direction. The movable die plate opening/closing device 14 is provided with a servomotor (electric motor) 21 arranged on the base member 1 (or the fixed die plate 2), a ball screw 22, a supporting member 26 fixed to the base member 1 (or the fixed die plate 2) and supporting the ball screw 22 so as to rotate freely, a nut 24 screwed with a thread groove 22a of the ball screw 22, a supporting member 25 fixed to the movable die plate 3 to support the nut 24 and a power-transmitting mechanism 23 for transmitting the power of the servomotor 21 to the ball screw 22. The power-transmitting mechanism 23 includes, for example, at least one of a gear wheel pulley, a toothed belt and a reduction gear. The movable die plate opening/closing device 14 drives the servomotor 21, thereby allowing the movable die plate 3 to move to the fixed die plate 2 in the Y-axis direction.

The rotating die plate opening/closing device 15 allows the rotating die plate 9 to move in the Y-axis direction. The rotating die plate opening/closing device 15 is provided with a servomotor (electric motor) 31 arranged on the base member 1 (or the fixed die plate 2), a ball screw 32, a supporting member 34 fixed to the base member 1 (or the fixed die plate 2), thereby supporting the ball screw 32 so as to rotate freely, a nut 33 screwed with a thread groove 32a of the ball screw 32, a supporting member 35 fixed to the rotating member 7 to support the nut 33, and a power-transmitting mechanism 36 for transmitting the power of the servomotor 31 to the ball screw 32. The power-transmitting mechanism 36 includes, for example, at least one of a gear wheel pulley, a toothed belt and a reduction gear. The rotating die plate opening/closing device 15 drives the servomotor 31, thereby allowing the rotating die plate 9 to move to the fixed die plate 2 in the Y-axis direction.

Figure 3:
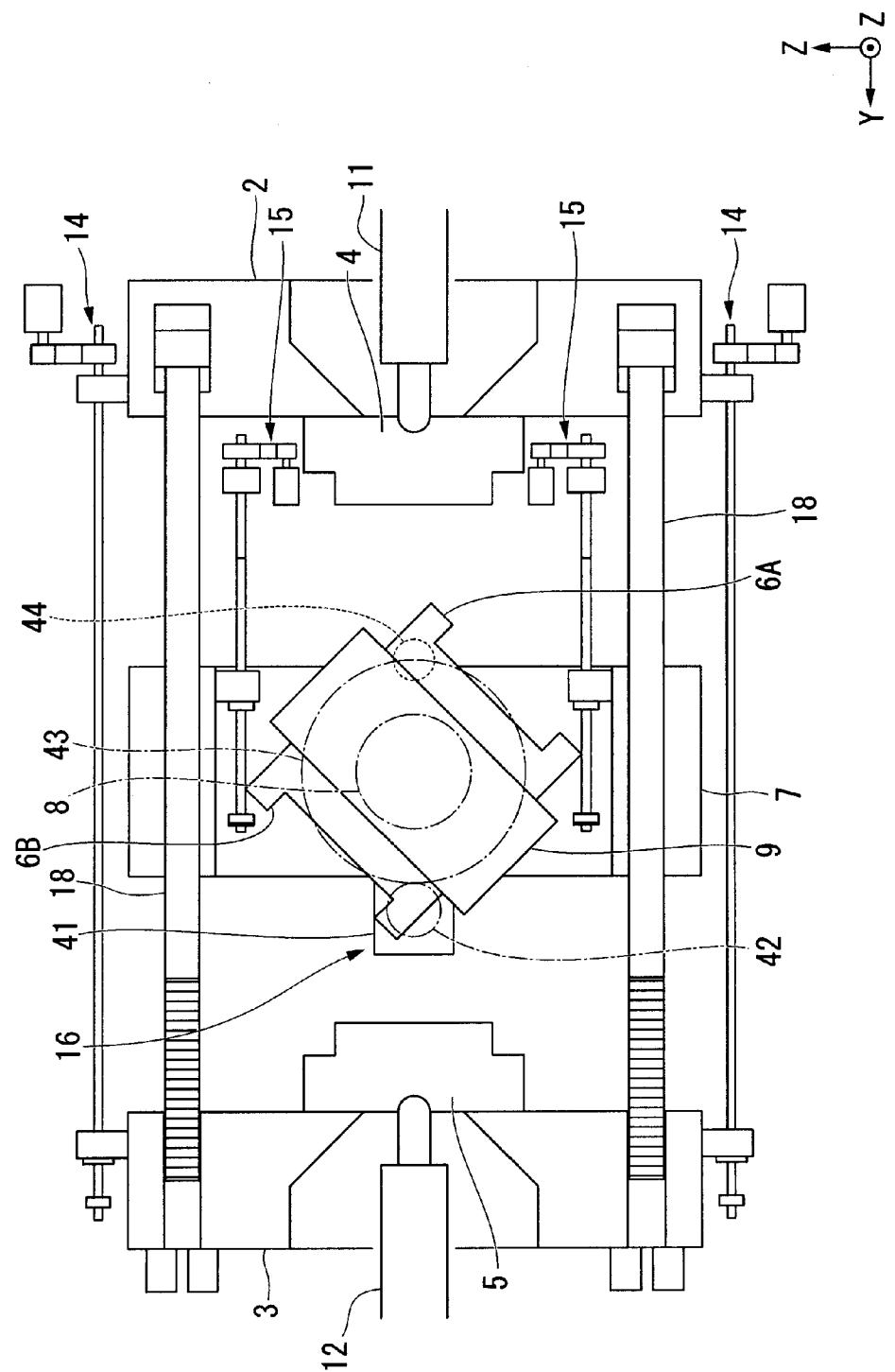
FIG. 3 is a plan view showing one example of a procedure of the injection molding machine related to the first embodiment.

FIG. 3 is a view showing one example of a procedure of the injection molding machine 10 related to the present embodiment. As shown in FIG. 3, the rotating die plate rotating device 16 allows the rotating die plate 9 to rotate in the θZ direction. The rotating die plate rotating device 16 allows the rotating die plate 9 to rotate in one direction (clockwise direction) and in the other direction (counter-clockwise direction) related to the θZ direction. The rotating die plate 9 is rotated, by which the rotating mold 6A connected to a first face 91 of the rotating die plate 9 is able to change a state opposing to the fixed-side mold 4 to a state opposing to the movable-side mold 5 or vice versa. Similarly, the rotating die plate 9 is rotated, by which the rotating mold 6B connected to a second face 92 of the rotating die plate 9 is able to change a state opposing to the movable-side mold 5 to a state opposing to the fixed-side mold 4 or vise versa.

Figure 4:
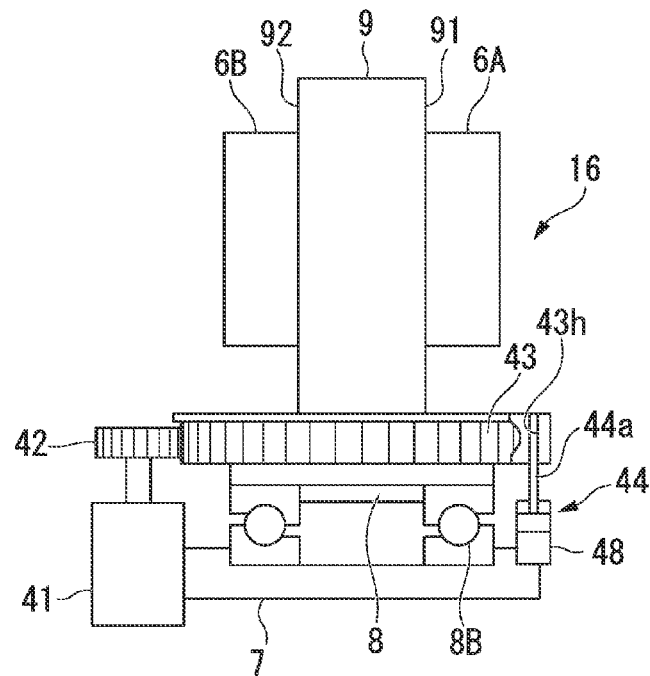
FIG. 4 is a side elevational view showing one example of a rotating die plate rotating device related to the first embodiment.

FIG. 4 is a side elevational view showing the rotating die plate rotating device 16 related to the present embodiment. In FIG. 4, the rotating die plate rotating device 16 is provided with a servomotor (electric motor) 41 installed on the rotating member 7, a pinion 42 connected to the servomotor 41, a gear wheel 43 mating with the pinion 42 and installed so as to be integral with the rotating die plate 9 and a positioning mechanism 44 capable of fixing a position of the rotating die plate 9. The lower end of the rotating die plate 9 is connected to a shaft member 8. The rotating die plate 9 is fixed to the shaft member 8. The shaft member 8 is supported by a bearing 8B so as to rotate freely in the θZ direction. The gear wheel 43 is arranged on the periphery of the shaft member 8. The gear wheel 43 is formed integrally with the shaft member 8.

The positioning mechanism 44 is able to fix a position of the rotating die plate 9 at least in one of a first state that the rotating mold 6A opposes the fixed-side mold 4 and the rotating mold 6B opposes the movable-side mold 5 and a second state that the rotating mold 6B opposes the fixed-side mold 4 and the rotating mold 6A opposes the movable-side mold 5. The positioning mechanism 44 is provided with a positioning pin 44a and a hydraulic cylinder 48 which allows the positioning pin 44a to move in the Z-axis direction. When positioning the rotating die plate 9, the positioning mechanism 44 drives the hydraulic cylinder 48, thereby allowing the positioning pin 44a to move in the +Z direction, and arranging the positioning pin 44a at an aperture 43H formed on the gear wheel 43. Thereby, the rotation of the gear wheel 43 is restricted, thereby fixing a position of the shaft member 8 and that of the rotating die plate 9 in relation to the θZ direction. On the other hand, when the die plate 9 is rotated in the θZ direction, the rotating die plate rotating device 16 removes the positioning pin 44a from the aperture 43H to drive the servomotor 41. The servomotor 41 is driven, by which the gear wheel 43 mating with the pinion 42 is rotated to cause rotation of the shaft member 8 and the rotating die plate 9.

The injection molding machine 10 is also provided with a hydraulic clamping device 20. The hydraulic clamping device 20 carries out mold clamping procedures at the same time to the fixed die plate 2, the rotating die plate 9 and the movable die plate 3. The hydraulic clamping device 20 is provided with four hydraulic cylinders 2a housed inside the fixed die plate 2, four rod members 18, each of which is jointed to a ram 18b of the hydraulic cylinder 2a and installed so as to penetrate through the movable die plate 3 and provided with a ring groove 18a, and four split nuts 17 arranged outside the movable die plate 3 and capable of making an engagement with the ring groove 18a of the rod member 18.

The rotating mold 6A is arranged on the first face 91 of the rotating die plate 9, and the rotating mold 6B is arranged on the second face 92 of the rotating die plate 9 on the opposite side of the first face 91. The rotating mold 6A is substantially similar in shape to the rotating mold 6B.

The fixed-side mold 4 is arranged on the −Y side with respect to the rotating die plate 9. The movable-side mold 5 is arranged on the +Y side with respect to the rotating die plate 9. The rotating die plate 9 rotates in the θZ direction, thereby allowing one of the rotating mold 6A and the rotating mold 6B to oppose the fixed-side mold 4 and allowing the other of the rotating mold 6A and the rotating mold 6B to oppose the movable-side mold 5.

Each of the rotating molds 6A, 6B is fitted into the fixed-side mold 4 and able to form a first cavity CA1 between the fixed-side mold 4 and itself. Similarly, each of the rotating molds 6A, 6B is fitted into the movable-side mold 5 and able to form a second cavity CA2 between the movable-side mold 5 and itself.

The hydraulic clamping device 20 carries out mold clamping procedures at the same time to the fixed die plate 2, the rotating die plate 9 and the movable die plate 3 in a state that the rotating mold 6A opposes the fixed-side mold 4 and the rotating mold 6B opposes the movable-side mold 5, thus making it possible to provide the first cavity CA1 formed of the rotating mold 6A and the fixed-side mold 4, and the second cavity CA2 formed of the rotating mold 6B and the movable-side mold 5 respectively on the −Y side and the +Y side of the rotating die plate 9. Similarly, the hydraulic clamping device 20 carries out mold clamping procedures at the same time to the fixed die plate 2, the rotating die plate 9 and the movable die plate 3 in a state that the rotating mold 6B opposes the fixed-side mold 4 and the rotating mold 6A opposes the movable-side mold 5, thus making it possible to provide the first cavity CA1 formed of the rotating mold 6B and the fixed-side mold 4, and the second cavity CA2 formed of the rotating mold 6A and the movable-side mold 5 respectively on the −Y side and the +Y side of the rotating die plate 9.

The first injection unit 11 is able to supply a plasticized first resin to the first cavity CA1 formed between the fixed-side mold 4 and one of the rotating mold 6A and the rotating mold 6B. The second injection unit 12 is able to supply a plasticized second resin to the second cavity CA2 formed between the movable-side mold 5 and the other of the rotating mold 6A and the rotating mold 6B. The second injection unit 12 is able to move on the base member 1 together with the movable die plate 3.

Thus, in the present embodiment, the injection molding machine 10 forms the first cavity CA1 into which the first resin is injected from the first injection unit 11 between one of the rotating mold 6A and the rotating mold 6B and the fixed-side mold 4, and forms the second cavity CA2 into which the second resin is injected from the second injection unit 12 between the other of the rotating mold 6A and the rotating mold 6B and the movable-side mold 5.

The nozzle touch cylinder 61 couples the first injection unit 11 with the fixed die plate 2. The nozzle touch cylinder 62 couples the second injection unit 12 with the movable die plate 3. The nozzle touch cylinders 61, 62 are able to expand and contract. The nozzle touch cylinder 61 contracts, by which the first injection unit 11 comes closer to the fixed die plate 2. Thereby, an injection port of a nozzle of the first injection unit 11 from which the plasticized first resin is injected is in contact with the fixed-side mold 4. Further, the nozzle touch cylinder 62 contracts, causing the second injection unit 12 comes closer to the movable die plate 3. Thereby, an injection port of a nozzle of the second injection unit 12 from which the plasticized second resin is injected is in contact with the movable-side mold 5.

Figure 5:
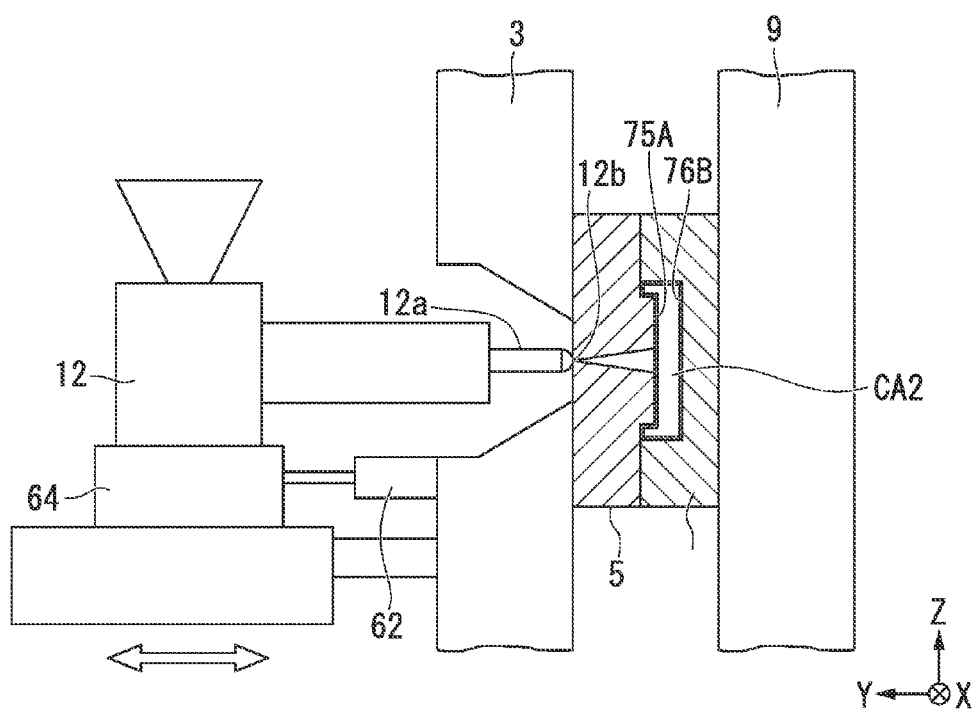
FIG. 5 is a plan view showing one example of some of the procedures of the injection molding machine related to the first embodiment.

FIG. 5 is a view showing a state that the nozzle touch cylinder 62 is contracted and the injection port 12b of the nozzle 12a of the second injection unit 12 from which the plasticized second resin is injected is pressed to the movable-side mold 5. As shown in FIG. 5, the nozzle touch cylinder 62 is contracted, causing the injection port 12b of the nozzle 12a of the second injection unit 12 is in contact with the movable-side mold 5. Respectively in a procedure which allows the movable-side mold 5 to be in contact with the rotating mold 6B and a procedure which separates the movable-side mold 5 from the rotating mold 6B, the injection port 12b of the nozzle 12a is constantly in contact with the movable-side mold 5. Thereby, soon (for example, simultaneously) after completion of the procedure which allows the movable-side mold 5 to be in contact with the rotating mold 6B, it is possible to start a procedure which injects a resin from the injection port 12b into the second cavity CA2 formed between the movable-side mold 5 and the rotating mold 6B. Further, in carrying out the procedure which separates the movable-side mold 5 from the rotating mold 6B, it is possible to suppress leakage of the resin from, for example, the injection port 12b, due to the fact that the injection port 12b of the nozzle 12a is in contact with the movable-side mold 5.

Figure 6:
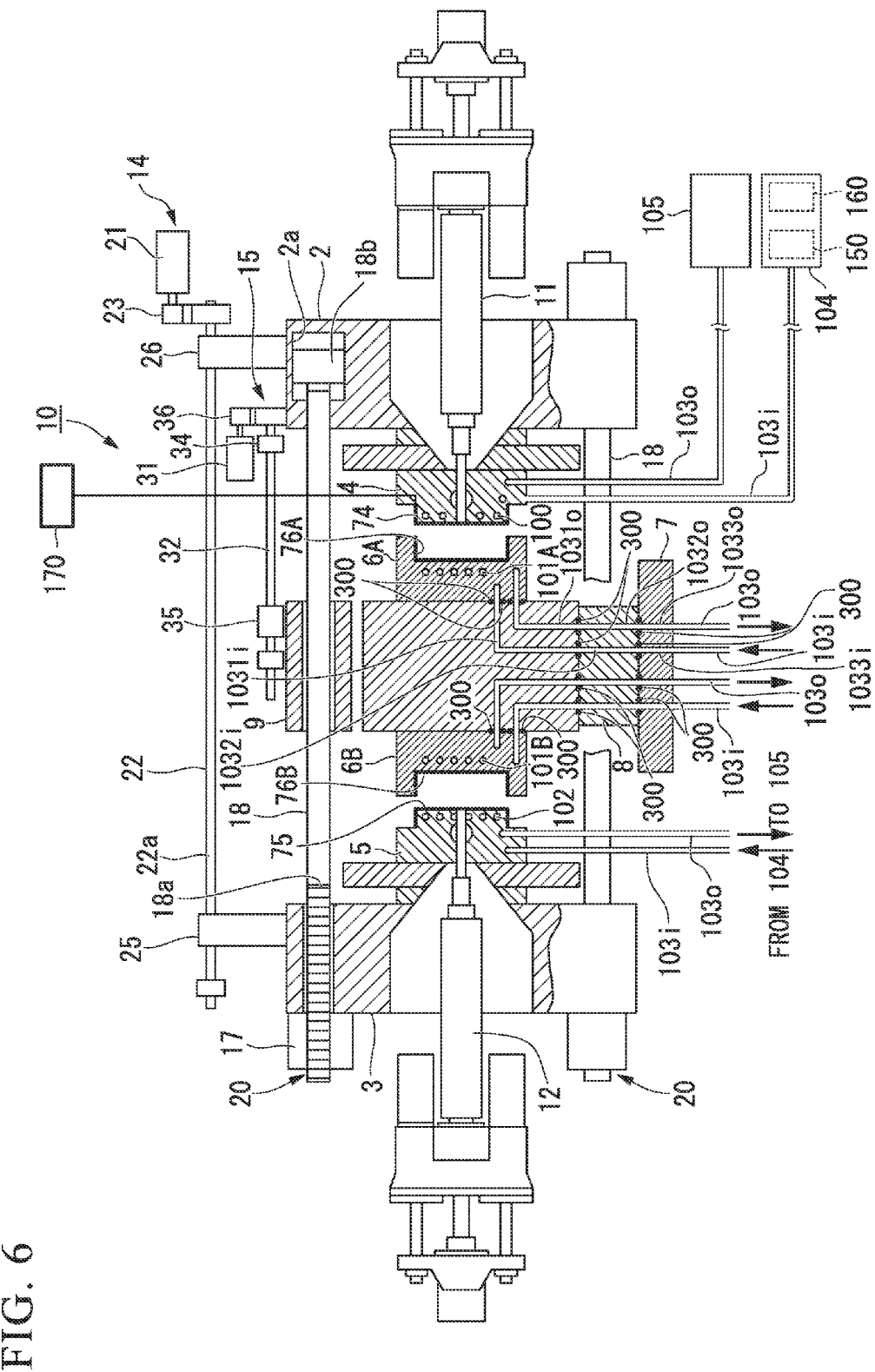
FIG. 6 is a view showing the vicinities of a fixed-side mold, a rotating mold, a rotating mold and a movable-side mold related to the first embodiment.

FIG. 6 is a view which shows the vicinities of the fixed-side mold 4, the rotating mold 6A, the rotating mold 6B and the movable-side mold 5. The fixed-side mold 4 has an internal flow channel 100 through which a fluid flows. One end of the internal flow channel 100 is connected with a supply channel 103i and the other end is connected with a recovery flow channel 103o. A cooling medium for cooling the fixed-side mold 4 is supplied to the internal flow channel 100 via the supply channel 103i. The cooling medium which has flowed through the internal flow channel 100 is recovered via the recovery flow channel 103o.

Similar to the fixed-side mold 4, the rotating mold 6A, the rotating mold 6B and the movable-side mold 5 are provided with respective internal flow channels 101A, 101B, 102 through which a fluid flows. The supply channel 103i is connected to one end of each of the internal flow channels 101A, 101B, 102, and the recovery flow channel 103o is connected to the other end of each of them. A cooling medium for cooling the rotating mold 6A, the rotating mold 6B and the movable-side mold 5 is supplied via the supply channel 103i to the respective internal flow channels 101A, 101B, 102. The cooling medium which has flowed through the internal flow channels 101A, 101B, 102 is recovered via the recovery flow channel 103o.

In the present embodiment, the injection molding machine 10 is provided with a cooling medium supplying device 104 for supplying a cooling medium to the internal flow channels 100, 101A, 101B, 102 and a cooling medium recovery device 105 for recovering the cooling medium from the internal flow channels 100, 101A, 101B, 102.

The cooling medium supplying device 104 supplies a cooling medium via the supply channel 103i to the internal flow channels 100, 101A, 101B, 102. The cooling medium supplied from the cooling medium supplying device 104 flows through the supply channel 103i and is supplied to one end of each of the internal flow channels 100, 101A, 101B, 102. The cooling medium supplied to one end of each of the internal flow channels 100, 101A, 101B, 102 flows through the internal flow channels 100, 101A, 101B, 102 and is discharged from the other end of each of the internal flow channels 100, 101A, 101B, 102. The cooling medium discharged from the other end of each of the internal flow channels 100, 101A, 101B, 102 flows through the recovery flow channel 103o. The cooling medium recovery device 105 recovers the cooling medium which has flowed through the internal flow channels 100, 101A, 101B, 102 via the recovery flow channel 103o.

In the present embodiment, a liquid is used as a cooling medium. The cooling medium supplying device 104 supplies the liquid to the internal flow channels 100, 101A, 101B, 102. In the present embodiment, water is used as the cooling medium. It is noted that chlorofluorocarbons, liquid nitrogen, and so on, may also be used as the cooling medium.

In the present embodiment, the cooling medium supplying device 104 has a temperature adjusting device 150 capable of adjusting the temperature of the liquid before supplying it to the internal flow channels 100, 101A, 101B, 102. Further, the cooling medium adjusting device 104 has a flow rate adjusting device 160 capable of adjusting the amount of liquid supplied per unit time to the internal flow channels 100, 101A, 101B, 102. Procedures of the cooling medium supplying device 104 including the temperature adjusting device 150 and the flow rate adjusting device 160 are controlled by the controller 200.

The controller 200 controls the temperature adjusting device 150, thus making it possible to supply a liquid adjusted to a predetermined temperature by the cooling medium supplying device 104 via the supply channel 103i to the internal flow channels 100, 101A, 101B, 102.

The controller 200 also controls the flow rate adjusting device 160, thus making it possible to supply a predetermined amount of liquid per unit time from the cooling medium supplying device 104 via the supply channel 103i to the internal flow channels 100, 101A, 101B, 102.

As shown in FIG. 6, in the present embodiment, the supply channel 103i includes a first supply channel 1031i formed inside the rotating die plate 9, a second supply channel 1032i formed inside the shaft member 8 and a third supply channel 1033i formed inside the rotating member 7. Further, in the present embodiment, the recovery flow channel 103o includes a first recovery flow channel 1031o formed inside the rotating die plate 9, a second recovery flow channel 1032o formed inside the shaft member 8, and a third recovery flow channel 1033o formed inside the rotating member 7.

In the present embodiment, one end of the internal flow channel 101A of the rotating mold 6A is connected to one end of the first supply channel 1031i of the rotating die plate 9. A seal member 300 for suppressing leakage of the liquid flowing through the supply channel 103i is arranged between the rotating mold 6A and the rotating die plate 9. In the present embodiment, the seal member 300 is arranged near a connecting part at which one end of the internal flow channel 101A of the rotating mold 6A is connected to one end of the first supply channel 1031i of the rotating die plate 9.

Further, in the present embodiment, the other end of the internal flow channel 101A of the rotating mold 6A is connected to one end of the first recovery flow channel 1031o of the rotating die plate 9. The seal member 300 for suppressing leakage of the liquid flowing through the recovery flow channel 103o is arranged between the rotating mold 6A and the rotating die plate 9. In the present embodiment, the seal member 300 is arranged near a connecting part at which the other end of the internal flow channel 101A of the rotating mold 6A is connected to one end of the first recovery flow channel 1031o of the rotating die plate 9.

Similarly, one end of the internal flow channel 101B of the rotating mold 6B is connected to one end of the first supply channel 1031i of the rotating die plate 9. The seal member 300 for suppressing leakage of the liquid flowing through the supply channel is arranged near a connecting part at which one end of the internal flow channel 101B of the rotating mold 6B is connected to one end of the first supply channel 1031i of the rotating die plate 9. Further, the other end of the internal flow channel 101B of the rotating mold 6B is connected to one end of the first recovery flow channel 1031o of the rotating die plate 9. The seal member 300 for suppressing leakage of the liquid flowing through the recovery flow channel is arranged near a connecting part at which the other end of the internal flow channel 101B of the rotating mold 6B is connected to one end of the first recovery flow channel 1031o of the rotating die plate 9.

Further, the other end of the first supply channel 1031i of the rotating die plate 9 is connected to one end of the second supply channel 1032i of the shaft member 8. The seal member 300 for suppressing leakage of the liquid flowing through the supply channel is arranged between the rotating die plate 9 and the shaft member 8. In the present embodiment, the seal member 300 is arranged near a connecting part at which the other end of the first supply channel 1031i of the rotating die plate 9 is connected to one end of the second supply channel 1032i of the shaft member 8.

Further, the other end of the first recovery flow channel 1031o of the rotating die plate 9 is connected to one end of the second recovery flow channel 1032o of the shaft member 8. The seal member 300 for suppressing leakage of the liquid flowing through the recovery flow channel is arranged between the rotating die plate 9 and the shaft member 8. In the present embodiment, the seal member 300 is arranged near a connecting part at which the other end of the first recovery flow channel 1031o of the rotating die plate 9 is connected to one end of the second recovery flow channel 1032o of the shaft member 8.

Similarly, the other end of the second supply channel 1032i of the shaft member 8 is connected to one end of the third supply channel 1033i of the rotating member 7. The seal member 300 for suppressing leakage of the liquid flowing through the supply channel is arranged near a connecting part at which the other end of the second supply channel 1032i of the shaft member 8 is connected to one end of the third supply channel 1033i of the rotating member 7.

Further, the other end of the second recovery flow channel 1032o of the shaft member 8 is connected to one end of the third recovery flow channel 1033o of the rotating member 7. The seal member 300 for suppressing leakage of the liquid flowing through the recovery flow channel is arranged near a connecting part at which the other end of the second recovery flow channel 1032o of the shaft member 8 is connected to one end of the third recovery flow channel 1033o of the rotating member 7.

In the present embodiment, for example, an O-ring and a V-ring may be used as the seal member 300. The seal member 300 for suppressing leakage of the liquid can be made simple in constitution.

Further, the other end of the third supply channel 1033i of the rotating member 7 is connected via a flexible tube which is flexible to the cooling medium supplying device 104. Still further, the other end of the third recovery flow channel 1033o of the rotating member 7 is connected via the flexible tube which is flexible to the cooling medium recovery device 105. Thereby, the rotating die plate 9 is not prevented from rotating.

In addition, in the present embodiment, the injection molding machine 10 is provided with a heating device 74 capable of increasing a temperature on an inner face of the fixed-side mold 4 which forms the first cavity CA1. In the present embodiment, the heating device 74 is an electric heater arranged on the fixed-side mold 4. In the present embodiment, the inner face of the fixed-side mold 4 which forms the first cavity CA1 is at least partially formed with the electric heater.

Similarly, the injection molding machine 10 is provided with a heating device 76A capable of increasing the temperature of the inner face of the rotating mold 6A which forms the first cavity CA1 between the fixed-side mold 4 and itself and the second cavity CA2 between the movable-side mold 5 and itself, a heating device 76B capable of increasing the temperature of the inner face of the rotating mold 6B which forms the first cavity CA1 between the fixed-side mold 4 and itself and the second cavity CA2 between the movable-side mold 5 and itself, and a heating device 75 capable of increasing the temperature of the inner face of the movable-side mold 5 which forms the second cavity CA2. The heating device 76A includes an electric heater arranged on the rotating mold 6A, the heating device 76B includes an electric heater arranged on the rotating mold 6B, and the heating device 75 includes an electric heater arranged on the movable-side mold 5.

In addition, in the present embodiment, an explanation will be made by exemplifying a case where inner faces of the molds 4, 6A, 6B, 5 are at least partially formed with the electric heaters 74, 76A, 76B, 75. For example, as an electric heater, a cartridge heater, for example, may be used to install the electric heater inside the molds.

Further, in the present embodiment, the injection molding machine 10 is provided with an electricity supplying device 170 capable of supplying electricity to the electric heaters 74, 76A, 76B, 75. A procedure of the electricity supplying device 170 is controlled by the controller 200. The controller 200 controls the electricity supplying device 170 to supply electricity to the electric heaters 74, 76A, 76B, 75, thus making it possible to heat the fixed-side mold 4, the rotating mold 6A, the rotating mold 6B, and the movable-side mold 5.

Next, an explanation will be made for one example of an injection molding method using the injection molding machine 10 having the above-described constitution.

First, an explanation will be made for rough procedures of the injection molding method of the present invention. The injection molding method of the present embodiment includes a so-called two-material injection molding step and also includes a primary injection molding step in which an injection molding is carried out at the second cavity CA2 on the side of the second injection unit 12, and a secondary injection molding step in which an injection molding is carried out at the first cavity CA1 on the side of the first injection unit 11.

Here, in the following explanation, a procedure in which at least one of the rotating mold 6A and the rotating mold 6B is fitted into the fixed-side mold 4 to form the first cavity CA1, and/or a procedure in which at least one of the rotating mold 6A and the rotating mold 6B is fitted into the movable-side mold 5 to form the second cavity CA2 are referred to as a mold closing procedure, whenever necessary.

Further, a procedure in which at least one of the rotating mold 6A and the rotating mold 6B which have been fitted is separated from the fixed-side mold 4, and/or a procedure in which at least one of the rotating mold 6A and the rotating mold 6B which have been fitted is separated from the movable-side mold 5 are referred to as a mold opening procedure, whenever necessary.

In addition, a procedure in which the mold closing procedure is carried out and the hydraulic clamping device 20 is used to give force to a direction in which the rotating mold 6A (rotating mold 6B) comes closer to the fixed-side mold 4, and/or a procedure in which force is given to a direction in which the rotating mold 6B (rotating mold 6A) comes closer to the movable-side mold 5 are referred to as a mold clamping procedure, whenever necessary.

In addition, a procedure in which a first resin is injected from the first injection unit 11 to the first cavity CA1 is referred to as a first injection procedure, whenever necessary. A procedure in which a second resin is injected from the second injection unit 12 to the second cavity CA2 is referred to as a second injection procedure, whenever necessary.

(Primary Injection Molding Step)

First, the controller 200 moves in such a manner that the rotating die plate 9 and the movable die plate 3 are allowed to come closer to the fixed die plate 2, carrying out the mold closing procedure to form the first cavity CA1 and the second cavity CA2, and using the hydraulic clamping device 20 to carry out the mold clamping procedure. Here, the first cavity CA1 is formed between the rotating mold 6A and the fixed-side mold 4, while the second cavity CA2 is formed between the rotating mold 6B and the movable-side mold 5.

At a predetermined timing after completion of the mold clamping procedure, the controller 200 carries out the second injection procedure. That is, the controller 200 controls to inject a melted second resin from the second injection unit 12 to the second cavity CA2 to effect filling. The second resin filled into the second cavity CA2 is cooled by a liquid flowing through the internal flow channels 102, 101B and solidified accordingly.

(Mold Rotating Step)

At a predetermined timing after the lapse of the solidification time during which the second resin can be solidified, the controller 200 moves in such a manner as to separate the movable die plate 3 and the rotating die plate 9 from the fixed die plate 2, carrying out the mold opening procedure, thereby giving a sufficient clearance to each of the die plates 2, 9, 3. Then, the controller 200 rotates the rotating die plate 9 at 180 degrees, thereafter, moving so as to allow the rotating die plate 9 and the movable die plate 3 to come closer to the fixed die plate 2, carrying out the mold closing procedure to form the first cavity CA1 and the second cavity CA2, and using the hydraulic clamping device 20 to carry out the mold clamping procedure. Here, the first cavity CA1 is formed between the rotating mold 6B and the fixed-side mold 4, and the second cavity CA2 is formed between the rotating mold 6A and the movable-side mold 5.

(Secondary Injection Molding Step)

At a predetermined timing after completion of the mold clamping procedure, the controller 200 carries out the first injection procedure. That is, the controller 200 controls to inject the melted first resin from the first injection unit 11 into the first cavity CA1 to effect filling. At this time, the first cavity CA1 is formed between a molded article adhered on the rotating mold 6B and the fixed-side mold 4. The first resin which has been filled into the first cavity CA1 is cooled by a liquid flowing through the internal flow channels 101, 101B and solidified accordingly. Thereby, a two-material molded article (plastic product) on which two materials are overlapped is molded.

The controller 200 also carries out the second injection procedure to the second cavity CA2, together with the first injection procedure. That is, in order to form a subsequent two-material molded article, the controller 200 controls to inject the melted second resin from the second injection unit 12 into the second cavity CA2 formed between the rotating mold 6A and the movable-side mold 5 to effect filling in accordance with procedures similar to those described in the above-described primary injection molding step. The second resin which has been filled into the second cavity CA2 is cooled by a liquid flowing through the internal flow channels 102, 101A and solidified thereby.

After the first injection procedure and the second injection procedure are completed and the first and the second resins are solidified, the controller 200 moves in such a manner as to separate the movable die plate 3 and the rotating die plate 9 from the fixed die plate 2, carrying out the mold opening procedure to give a sufficient clearance to each of the die plates 2, 9, 3. Then, the controller 200 uses a taking-out device (not shown) to take out a two-material molded article adhered on the rotating mold 6B which has formed the first cavity CA1.

Hereinafter, the controller 200 repeats sequentially rotation of the rotating die plate 9 at 180 degrees, mold closing procedure, first injection procedure, second injection procedure, cooling procedure, mold opening procedure, and taking-out of the two-material molded article, thereby producing two-material molded articles continuously.

Next, an explanation will be made for characteristic parts of the injection molding method related to the present embodiment.

As described above, in the present embodiment, the mold closing procedure, the first injection procedure, the second injection procedure and the cooling procedure are carried out continuously. For the purpose of simplifying the explanation, the following explanation will be made by exemplifying the mold closing procedure which uses the rotating mold 6A and the fixed-side mold 4, the first injection procedure which is given to the first cavity CA1 formed between the rotating mold 6A and the fixed-side mold 4, and the procedure for cooling the rotating mold 6A and the fixed-side mold 4.

Figure 7:
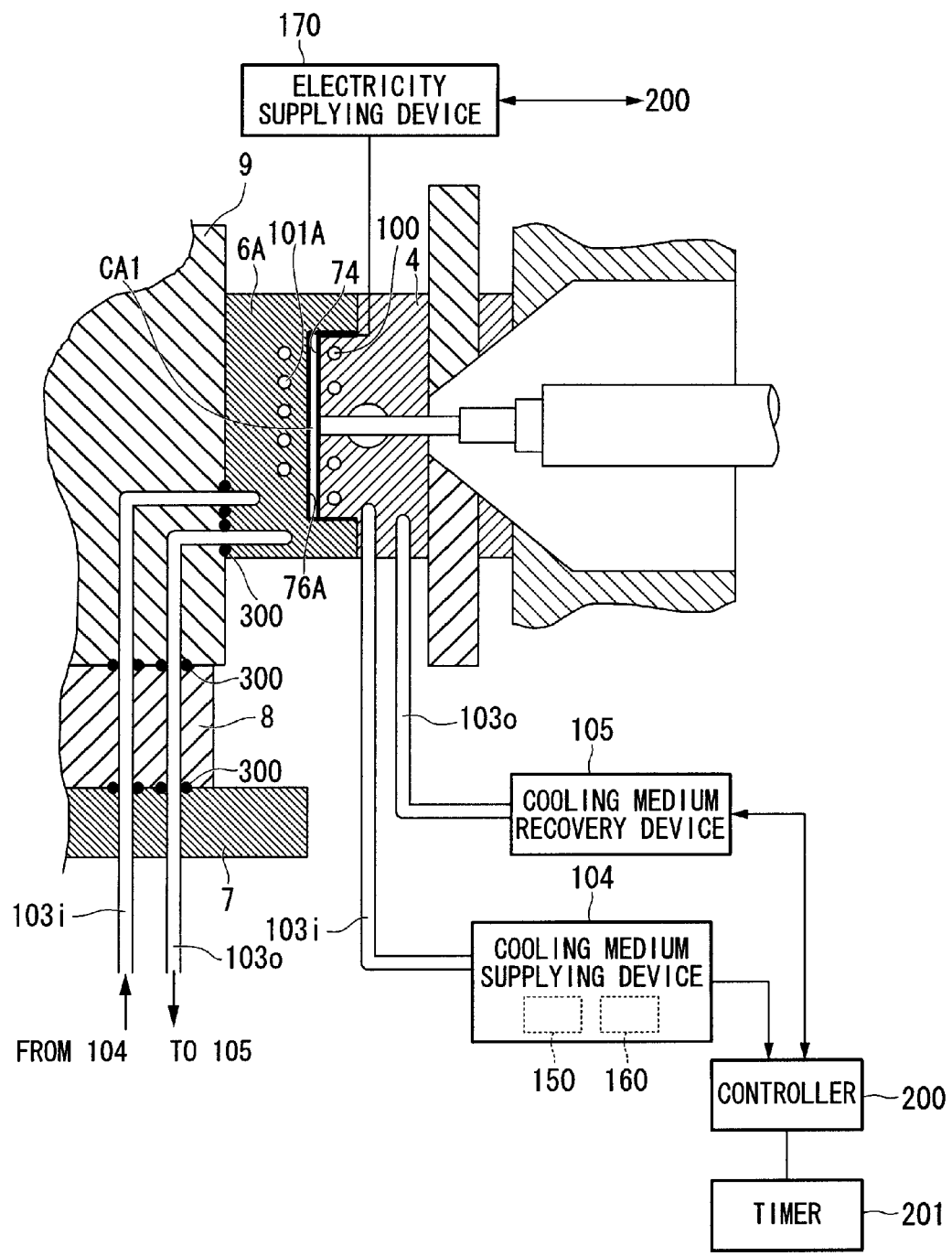
FIG. 7 is a cross sectional view with an enlarged part of the injection molding machine related to the first embodiment.
Figure 8:
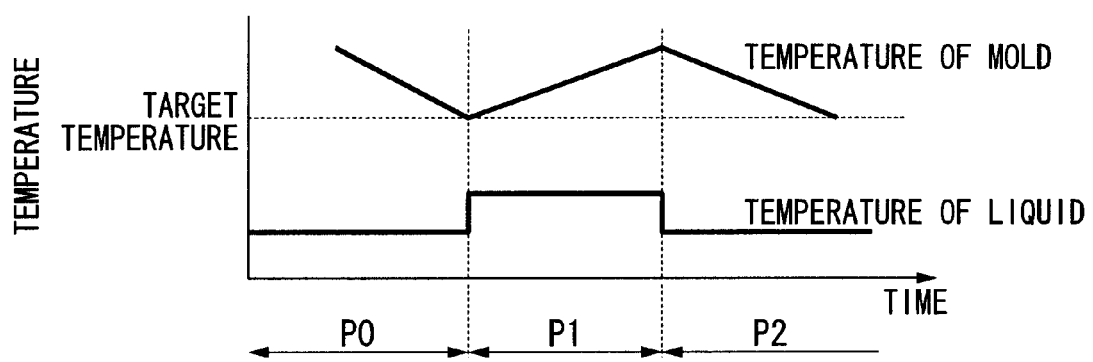
FIG. 8 is a view for explaining an injection molding method related to the first embodiment.

FIG. 7 is a cross sectional view with an enlarged part of the injection molding machine 10 of the present embodiment. FIG. 8 is a view showing a relationship between temperatures of the molds 4, 6A related to the present embodiment, temperatures of a liquid in the internal flow channels 100, 101A and the time.

In the present embodiment, the injection molding method using the injection molding machine 10 includes a procedure in which a liquid is continuously supplied to the internal flow channels 100, 101A formed inside the molds 4, 6A during a preparation period P1 before the first resin is injected into the first cavity CA1 formed by the fixed-side mold 4 and the rotating mold 6A, and an injection period P2 in which the first resin after the preparation period P1 is injected, and a procedure in which the electric heaters 74, 76A are used to heat the molds 4, 6A at least during a part of the preparation period P1.

In the present embodiment, the controller 200 uses the cooling medium supplying device 104 to continuously supply a liquid to the internal flow channels 100, 101A respectively during a preliminary period P0 prior to the preparation period P1, the preparation period P1 and the injection period P2. In the present embodiment, the controller 200 controls a temperature adjusting device 150 and uses the cooling medium supplying device 104 to feed the liquid substantially at a constant temperature respectively during the preliminary period P0, the preparation period P1 and the injection period P2.

The above-described mold closing procedure is carried out during the preliminary period P0. It is noted that the mold closing procedure may be carried out during the preparation period P1. The first injection procedure is carried out during the injection period P2.

At least during a part of the preparation period P1, the controller 200 uses the electricity supplying device 170 to supply electricity to the electric heaters 74, 76A, thereby heating the molds 4, 6A. That is, the controller 200 preheats the molds 4, 6A prior to the first injection procedure. Hereinafter, a procedure in which the molds 4, 6A are preheated during the preparation period P1 is referred to as a preheating procedure, whenever necessary.

The preheating procedure is carried out, by which it is possible to suppress deterioration in the quality of plastic products to be produced and also suppress the decreased productivity of making plastic products. For example, where the first injection procedure is carried out in a state that the molds 4, 6A are excessively cooled, the first resin in a melted state which has been injected into the first cavity CA1 is abruptly increased in viscosity and decreased in fluidity. As a result, there are found, failure in sufficiently filling the first cavity CA1 with the first resin, for example, occurrence of cracks in plastic products to be produced and occurrence of a skin layer due to molecular gradient, etc. This may result in deterioration in the quality of plastic products to be produced and furthermore, decreased productivity of making plastic products. According to the present embodiment, since the preheating procedure is carried out, it is possible to suppress deterioration in the quality of plastic products to be produced and also suppress a decrease in the productivity of making plastic products.

In the present embodiment, the controller 200 carries out a predetermined procedure in order to make different the temperature of a liquid in the internal flow channels 100, 101A between the preparation period P1, the preliminary period P0 and the injection period P2. In the present embodiment, the controller 200 makes the temperature of the liquid higher in the internal flow channels 100, 101A during the preparation period P1 than the temperature of the liquid in the internal flow channels 100, 101A during the preliminary period P0 and the injection period P2.

In the present embodiment, as a predetermined procedure, the controller 200 controls the flow rate adjusting device 160 between the preparation period P1, the preliminary period P0 and the injection period P2, thereby changing the amount of liquid supplied per unit time to the internal flow channels 100, 101A.

That is, as a predetermined procedure for changing the temperature of the liquid in the internal flow channels 100, 101A, the controller 200 carries out a procedure in which the cooling medium supplying device 104 (flow rate adjusting device 160) changes the amount of liquid supplied per unit time to the internal flow channels 100, 101A. The flow rate adjusting device 160 is provided with a pump for feeding a liquid (a cooling medium), for example, feeding the liquid in a predetermined amount per unit time according to the electricity supplied (driving force).

In the present embodiment, the controller 200 supplies electricity from the electricity supplying device 170 to the electric heaters 74, 76A during the preparation period P1, thereby supplying the liquid to the internal flow channels 100, 101A in a smaller amount per unit time during the preparation period P1 than during the preliminary period P0 and the injection period P2, with the molds 4, 6A being heated (preheated). Thereby, respectively during the preliminary period P0, the preparation period P1 and the injection period P2, the liquid flows through the internal flow channels 100, 101A of the molds 4, 6A and is warmed by the electric heaters 74, 76A arranged on the molds 4, 6A, although the liquid fed from the cooling medium supplying device 104 is substantially constant in temperature. Thereby, it is possible to suppress the fact that the liquid supplied to the internal flow channels 100, 101A prevents a preheating procedure by using the electric heaters 74, 76A. For example, a liquid flowing from inlets of the internal flow channels 100, 101A to the internal flow channels 100, 101A is warmed by some of the electric heaters 74, 76A arranged near the inlets of the internal flow channels 100, 101A, flowing into the internal flow channels 100, 101A. Thereby, the liquid supplied to the internal flow channels 100, 101A is increased in temperature, taking a smaller amount of heat from the molds 4, 6A. Therefore, it is possible to suppress the fact that the preheating procedure by using the electric heaters 74, 76A is prevented in view of the molds 4, 6A as a whole.

That is, in the present embodiment, in such a manner that the preheating procedure by using the electric heaters 74, 76A is not prevented by the liquid supplied to the internal flow channels 100, 101A, the controller 200 controls to supply the liquid to the internal flow channels 100, 101A in a smaller amount per unit time during the preparation period P1 including the preheating procedure (preheating period) than during the injection period P2. Thereby, it is possible to preheat the molds 4, 6A to a desired temperature without increasing the amount of electricity supplied from the electricity supplying device 170 to the electric heaters 74, 66A.

Further, in order to obtain a stable preheating procedure, a profile of temporal change in the amount of electricity supplied to the electric heaters 74, 76A of the respective molds 4, 6A and a profile of temporal change in temperature in a continuous molding step are respectively measured in advance, and a mean value profile obtained from the respective measurement data of the profiles of temporal change is set as a stable preheating profile. Then, the amount of electricity supplied to the electric heaters 74, 76A is effectively subjected to feedback control such as derivative control or integral control in such a manner as to meet the stable preheating profile.

After the preheating procedure of the molds 4, 6A is completed and the preparation period (preheating period) P1 is completed, they are shifted to the injection period P2. The controller 200 controls to supply the liquid to the internal flow channels 100, 101A in increases in the amount per unit time after completion of the preparation period P1 and at the same time with start of the injection period P2, thereby starting to cool the molds 4, 6A and also starting the first injection procedure. At a time point when the cooling is started, the molds 4, 6A are hardly decreased in temperature. Since the first resin is injected in a melted state into the molds 4, 6A, defects such as abrupt decreases in fluidity (abrupt increase in viscosity), the occurrences of cracks, and the occurrence of a skin layer are suppressed, and the molds 4, 6A are cooled sufficiently to result in a decrease in temperature, thus making it possible to solidify the first resin in a short time. As described above, a step of producing plastic products by using the molds 4, 6A is completed.

In the present embodiment, time is set in advance respectively for the preliminary period P0, the preparation period P1 and the injection period P2. Further, the controller 200 is provided with a timer 201 capable of measuring the time of the preliminary period P0, the preparation period P1 and the injection period P2. The controller 200 is able to set the timing for carrying out a predetermined procedure for making different the temperature of the liquid in the internal flow channels 100, 101A on the basis of measurement results by the timer 201.

In the present embodiment, the controller 200 adjusts the amount of liquid supplied per unit time during the preparation period P1 in such a manner that the temperature of the liquid in the internal flow channels 100, 101A during the preparation period P1 is equal to or lower than the boiling point of the liquid, and is also equal to or higher than the target temperature of the molds 4, 6A during the injection period P2. The controller 200 also adjusts an amount of liquid supplied per unit time during the injection period P2 in such a manner that the temperature of the liquid in the internal flow channels 100, 101A during the injection period P2 is equal to or lower than the target temperature of the molds 4, 6A during the injection period P2.

Here, the target temperature of the molds 4, 6A is a temperature at which the first resin injected into the first cavity CA1 can be solidified and set, whenever necessary, depending on the physical properties and so on, of the first resin to be used.

The temperature of the liquid in the internal flow channels 100, 101A during the preparation period P1 is adjusted to be equal to or lower than the boiling point of the liquid, and is also equal to or higher than the target temperature of the molds 4, 6A during the injection period P2. Thereby, it is possible to suppress the liquid to be changed into vapors in the internal flow channels 100, 101A during the preparation period P1 and it is also possible to sufficiently preheat the molds 4, 6A.

Further, the temperature of the liquid in the internal flow channels 100, 101A during the injection period P2 is adjusted to be equal to or lower than the target temperature of the molds 4, 6A during the injection period P2. Thereby, it is possible to sufficiently cool the molds 4, 6A during the injection period P2 and solidify the first resin in a short time. Therefore, the decreased productivity of making plastic products can be suppressed.

It is noted that the controller 200 is able to adjust the temperature of the liquid in the internal flow channels 100, 101A during the preparation period P1 to be equal to or lower than the target temperature of the molds 4, 6A during the preparation period P1, and also to be equal to or higher than the target temperature of the molds 4, 6A during the injection period P2. Thereby, for example, where the target temperature of the molds during the preparation period P1 is lower than a boiling point of the liquid, the preheating procedure by the electric heaters 74, 76A during the preparation period P1 is not prevented and the temperature elevation around the internal flow channels 100, 101A (the molds 4, 6A on the periphery) can be suppressed. Therefore, it is possible to accelerate a decrease in temperature around the internal flow channels 100, 101A during the injection period P2 and also solidify the first resin in a melted state in a short time.

An explanation has been so far made by exemplifying the mold closing procedure using the rotating mold 6A and the fixed-side mold 4, the first injection procedure given to the first cavity CA1 formed between the rotating mold 6A and the fixed-side mold 4, and the procedure for cooling the rotating mold 6A and the fixed-side mold 4. Since the mold closing procedure using the rotating mold 6B and the fixed-side mold 4, the first injection procedure given to the first cavity CA1 formed between the rotating mold 6B and the fixed-side mold 4 and the procedure for cooling the rotating mold 6B and the fixed-side mold 4 are also carried out similarly by the above procedures, the explanation thereof will be omitted. Further, the mold closing procedure using the rotating mold 6A and the movable-side mold 5, the second injection procedure given to the second cavity CA2 formed between the rotating mold 6A and the movable-side mold 5 and the procedure for cooling the rotating mold 6A and the movable-side mold 5 can be also carried out similarly by the above procedures. Further, the mold closing procedure using the rotating mold 6B and the movable-side mold 5, the second injection procedure given to the second cavity CA2 formed between the rotating mold 6B and the movable-side mold 5 and the procedure for cooling the rotating mold 6B and the movable-side mold 5 can be also carried out similarly by the above procedures. Therefore, the explanation thereof will be omitted.

Where the fixed-side mold 4, the movable-side mold 5 and rotating molds 6A, 6B are combined appropriately and in contact with each other, a failure in making a pair of the thus combined molds equal in temperature may cause a gap between faces in contact with each other due to a difference in thermal expansion thereof or may cause friction on meshing. Therefore, where the fixed-side mold 4, the movable-side mold 5 and the rotating molds 6A, 6B are heated up to the target temperature during the injection period, preferably is such a heating method that makes timing right in reaching the target temperature of each mold.

As this heating method, it is acceptable that the time necessary for elevating a temperature of each mold is measured in advance, and the controller 200 is used to take control so that timing of starting to heat each mold is deviated, with consideration given to a difference in the time necessary for elevating the temperature of each mold. For example, such control may be taken that heating is first started in a mold which is to complete temperature elevation last (reaching the target temperature) and thereafter heating is started in other molds individually. In this case, it is acceptable that electricity is supplied at a delayed timing from the electricity supplying device 170 to the electric heaters 74, 75, 76A, 76B arranged on each mold. It is also acceptable that an electricity supplying device 170 is installed on each of the electric heaters and the controller 200 is used to control the electricity supplying device 170.

Alternatively, there is another heating method in which time necessary for elevating a temperature of each mold is measured in advance, with consideration given to a difference in the time necessary for elevating the temperature of each mold, and such control may be taken such that heating is halted in midstream in a mold which is to complete temperature elevation earlier in order to wait for the temperature elevation of a mold which is to complete the temperature elevation after (reaching the target temperature). In this case, it is acceptable that control is taken in such a manner that heating is started at the same time in each mold, when a mold which is to complete the temperature elevation earlier reaches a predetermined temperature lower than the target temperature, the mold temperature is maintained at the predetermined temperature, and at a time point when a mold which is to complete the temperature elevation after reaches the predetermined temperature, heating is resumed in the mold which is to complete the temperature elevation earlier.

There is still another heating method in which time necessary for elevating a temperature of each mold is measured in advance, and with consideration given to a difference in the time necessary for elevating the temperature of each mold, control may be taken for a cooling medium supplying device 104 (the temperature adjusting device 150 and the flow rate adjusting device 160) so that the temperature elevation speed of each mold is delayed by the controller 200. For example, in such a manner as to delay the temperature elevation speed of a mold which is to complete the temperature elevation earlier (reaching the target temperature), control may be taken for increasing the amount of a cooling medium supplied to this mold. In this case, it is acceptable that the cooling medium supplied from the cooling medium supplying device 104 to the internal flow channels 100, 101, 101A, 102 of each mold is separately adjusted for the amount of the flow. It is also acceptable that the cooling medium supplying device 104 is installed individually on the internal flow channel of each mold and the controller 200 is used to control each cooling medium supplying device 104.

As explained so far, according to the present embodiment, in the injection molding machine 10, where the electric heaters 74, 76A are used to heat the molds 4, 6A and also a cooling liquid is supplied to the internal flow channels 100, 101A of the molds 4, 6A during the preparation period (preheating period) P1, it is possible to produce high-quality plastic products at a higher productivity, while suppressing the amount of electricity supplied to the electric heaters 74, 76A or the amount of the liquid to be used.

Further, in the present embodiment, a liquid is continuously (constantly) supplied by the cooling medium supplying device 104 respectively during the preliminary period P0, the preparation period (preheating period) P1 and the injection period P2. There is also an idea that supply of the liquid to the internal flow channels 100, 101A is halted during the preparation period P1 in order not to prevent a preheating procedure by the electric heaters 74, 76A. However, in this case, it is more likely that the electric heaters 74, 76A may vaporize the liquid remaining in the internal flow channels 100, 101A into steam. As a result, there is a possibility that the steam moves through the supply channel 103$i$ or the recovery flow channel 103$o$, thereby leaking out, for example, between the mold 6A and the rotating die plate 9, between the rotating die plate 9 and the shaft member 8, or between the shaft member 8 and the rotating member 7. A seal mechanism for suppressing leakage of steam is in general complicated in structure or higher in cost. Further, the seal mechanism for suppressing leakage of steam is required to be resistant in heat. In the present embodiment, since the liquid is continuously supplied, it is possible to suppress the occurrence of steam and also suppress leakage of the liquid (cooling medium) even by using the seal member 300 which is simple in structure.

In the above-described embodiment, in order to increase the temperature of the liquid in the internal flow channels 100, 101A during the preparation period P1, the amount of the liquid supplied per unit time to the internal flow channels 100, 101A is decreased during the preparation period P1. It is acceptable that, with the aim of increasing the temperature of the liquid in the internal flow channels 100, 101A during the preparation period P1, the controller 200 uses the temperature adjusting device 150 to change the temperature of the liquid supplied to the internal flow channels 100, 101A during the injection period P2 to the temperature of the liquid supplied to internal flow channels 100, 101A during the preparation period P1. That is, it is acceptable that the controller 200 uses the temperature adjusting device 150 to make the temperature of the liquid supplied to the internal flow channels 100, 101A during the preparation period P1 higher than the temperature of the liquid supplied to the internal flow channels 100, 101A during the injection period P2. Thereby, the temperature of the liquid in the internal flow channels 100, 101A during the preparation period P1 is increased to avoid the prevention of preheating procedure.

The Second Embodiment

Next, an explanation will be made for the second embodiment. In the following explanation, constituents which are the same or similar to those of the above-described embodiment will be denoted with the same reference numerals to simplify or omit the explanation thereof.

Figure 9:
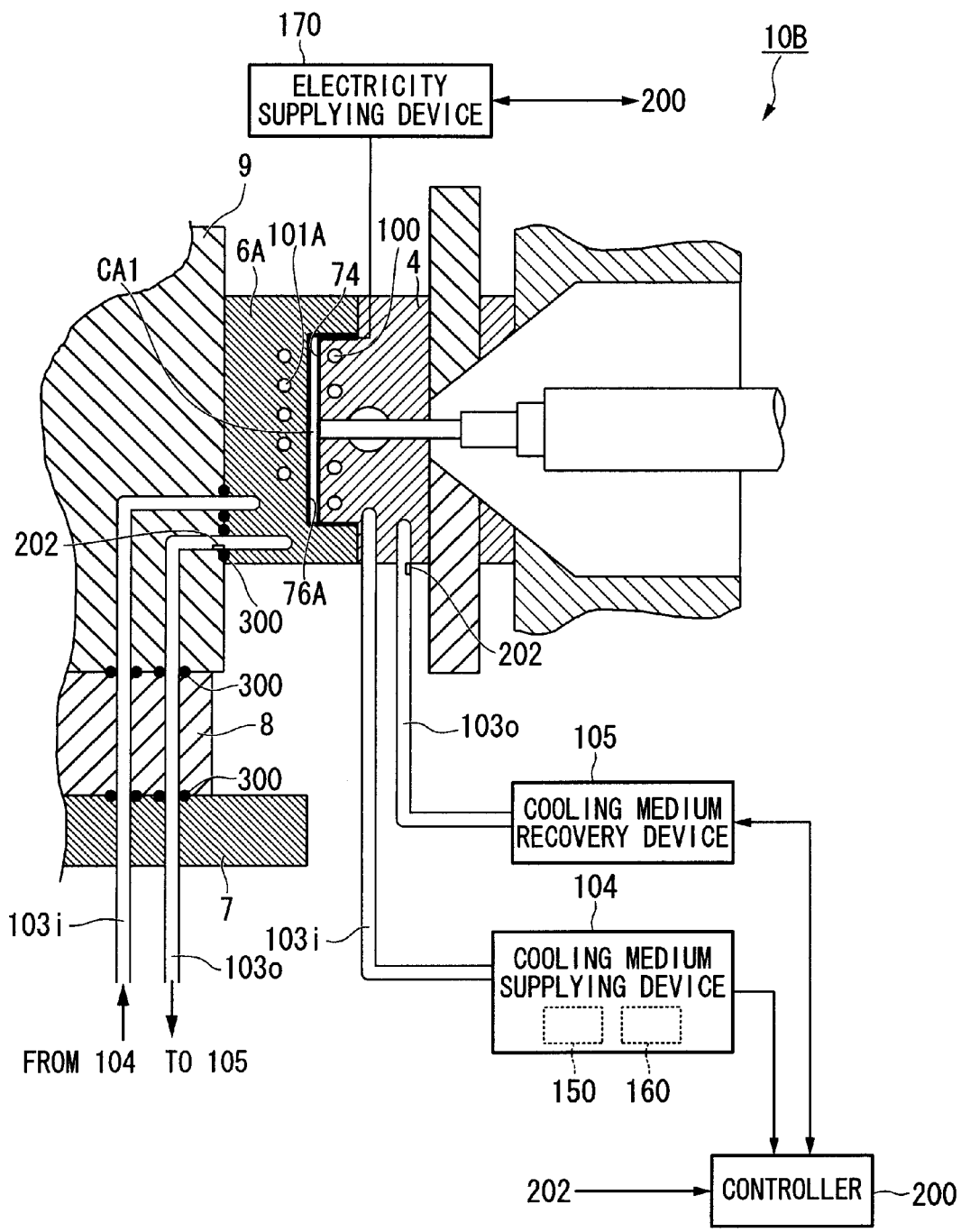
FIG. 9 is a cross sectional view with an enlarged part of an injection molding machine related to the second embodiment.

FIG. 9 is a view showing one example of an injection molding machine 10B related to the second embodiment. In the first embodiment which has been explained previously, the controller 200 carries out a predetermined procedure on the basis of measurement results by the timer 201. A characteristic part of the second embodiment which is different from that of the first embodiment lies in the point that the controller 200 carries out a predetermined procedure on the basis of detection results by a temperature sensor 202 capable of detecting a temperature of a liquid in the internal flow channels 100, 101A.

In FIG. 9, the injection molding machine 10B is provided with the temperature sensor 202 capable of detecting the temperature of the liquid in the internal flow channels 100, 101A. The controller 200 carries out a predetermined procedure on the basis of detection results by the temperature sensor 202. In an example shown in FIG. 9, the temperature sensor 202 is arranged near the other ends of the internal flow channels 100, 101A (near a connecting part of the internal flow channel with the recovery flow channel) in order to detect the temperature of the liquid discharged from the internal flow channels 100, 101A.

For example, the controller 200 halts the electricity supplied to the electric heaters 74, 76A after the molds 4, 6A reach a desired temperature during the preparation period P1, starts predetermined procedures of decreasing the temperature of the liquid in the internal flow channels 100, 101A (a procedure for decreasing the amount of liquid supplied per unit time and a procedure for decreasing the temperature of the liquid fed from the cooling medium supplying device 104) after confirmation that the temperature of the liquid discharged from the internal flow channels 100, 101A is stable on the basis of detection results by the temperature sensor 202, and also carries out the first injection procedure. It is also acceptable that after the first injection procedure is carried out, a predetermined procedure is started for decreasing the temperature of the liquid in the internal flow channels 100, 101A.

Further, the controller 200 determines the temperature of the liquid in the internal flow channels 100, 101A using the temperature sensor 202, while supplying electricity to the molds 4, 6A, halts supply of electricity to the molds 4, 6A after judgment that the molds 4, 6A have reached the desired temperature on the basis of detection results by the temperature sensor 202, and starts predetermined procedures of decreasing the temperature of the liquid in the internal flow channels 100, 101A (a procedure for decreasing an amount of liquid supplied per unit time and a procedure for decreasing the temperature of the liquid fed from the cooling medium supplying device), thus making it possible to carry out the first injection procedure. It is also acceptable that after the first injection procedure is carried out, a predetermined procedure is started to decrease the temperature of the liquid in the internal flow channels 100, 101A.

The Third Embodiment

Next, an explanation will be made for the third embodiment. In the following explanation, constituents which are the same or similar to those of the above-described embodiment will be denoted with the same reference numerals and explanation thereof will be simplified or omitted.

Figure 10:
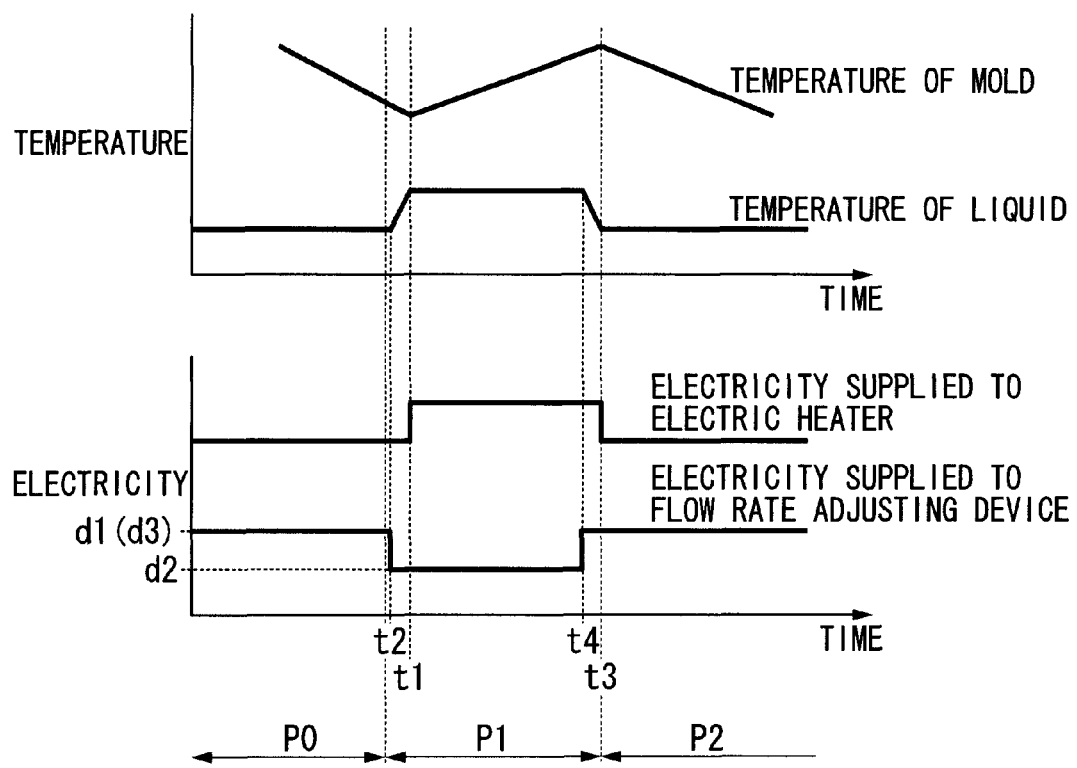
FIG. 10 is a view for explaining an injection molding method related to the third embodiment.

FIG. 10 is a view showing a relationship between the temperature of the molds 4, 6A related to the present embodiment, the temperature of the liquid in the internal flow channels 100, 101A and time, as well as the relationship between electricity supplied from the electricity supplying device 170 to the electric heaters 74, 76A, the electricity supplied to the flow rate adjusting device 160 for driving the cooling medium supplying device 104 (flow rate adjusting device 160) and time.

In the present embodiment, the predetermined procedure for changing the temperature of the liquid in the internal flow channels 100, 101A is a procedure for changing an amount of liquid supplied per unit time by the cooling medium supplying device 104 (flow rate adjusting device 160) to the internal flow channels 100, 101A. The flow rate adjusting device 160 is provided with, for example, a pump for feeding the liquid (cooling medium), and feeds the liquid in a predetermined amount per unit time, depending on the amount of electricity supplied (driving force).

Further, in the present embodiment, during the preparation period (preheating period) P1, in order to make the temperature of the molds 4, 6A equal to the target temperature in a state that electricity is supplied to the electric heaters 74, 76A, and that the liquid is supplied in a second amount per unit time from the cooling medium supplying device 104 to the internal flow channels 100, 101A. The second amount of the liquid for making the temperature of the molds 4, 6A equal to the target temperature is a known value depending on the amount of electricity supplied to the electric heaters 74, 76A, structures and physical properties, and so on, of the molds 4, 6A or by a preliminary experiment.

In the present embodiment, the controller 200 starts supplying electricity to the electric heaters 74, 76A at a first time point t1 during the preparation period P1 by the electricity supplying device 170, and also starts a predetermined procedure for increasing the temperature of the liquid in the internal flow channels 100, 101A at a second time point t2 prior to the first time point t1 during the preparation period P1 (a procedure for decreasing the amount of the liquid supplied per unit time to the internal flow channels 100, 101A).

In the present embodiment, during a period prior to the second time point t2 including the preliminary period P0, the controller 200 controls to supply electricity in a first electricity amount d1 to the flow rate adjusting device 160 (pump) from a predetermined power source (driving source). The cooling medium supplying device 104 feeds the liquid in a first amount per unit time to the internal flow channels 100, 101A, depending on the first electricity amount d1 of the thus supplied electricity.

The controller 200 switches over the electricity to be supplied from a predetermined power source (driving source) to the flow rate adjusting device 160 (pump) at the second time point t2 from the first electricity amount d1 to a second electricity amount d2. The second electricity amount d2 is a value at which a second amount of liquid per unit time can be fed by the cooling medium supplying device 104. At the second time point t2, the controller 200 starts to supply electricity in the second electricity amount d2 from the predetermined power source (driving source) to the flow rate adjusting device 160 (pump). The cooling medium supplying device 104 allows an amount of liquid supplied per unit time to change, depending on the second electricity amount d2 of the supplied electricity.

For example, where an amount of electricity supplied to the flow rate adjusting device 160 is changed, there is a possibility that it takes time before the cooling medium supplying device 104 allows the amount of liquid supplied per unit time to change from the first amount to the second amount (target value), or it takes time before the temperature of the liquid to be supplied reaches a target value. That is, a time lag may occur by the time the state of the liquid to be supplied changes into a target state. Therefore, with the time lag taken into account, the timing (second time point t2) is set for starting a predetermined procedure for increasing the temperature of the liquid in the internal flow channels 100, 101A, thus making it possible to efficiently carry out a preheating procedure of the molds 4, 6A in a short time.

In the present embodiment, an amount of the liquid supplied per unit time to the internal flow channels 100, 101A reaches the second amount at the first time point t1. That is, when operation of the electric heaters 74, 76A is started during the preparation period P1, the amount of liquid supplied to the internal flow channels 100, 101A has already reached a target value (second amount). Thereby, it is possible to suppress electricity consumption of the electric heaters 74, 76A and also to carry out the preheating procedure of the molds 4, 6A efficiently.

Further, in the present embodiment, the controller 200 halts electricity supplied to the electric heaters 74, 76A from the electricity supplying device 170 at a third time point t3 during the preparation period P1 and starts a predetermined procedure for decreasing the temperature of the liquid in the internal flow channels 100, 101A at a fourth time point t4 prior to the third time point t3 during the preparation period P1 (a procedure for increasing the amount of the liquid supplied per unit time to the internal flow channels 100, 101A).

The controller 200 switches over electricity supplied from a predetermined power source (driving source) to the flow rate adjusting device 160 (pump) at the fourth time point t4 from the second electricity amount d2 to the third electricity amount d3. It is noted that in the present embodiment, the third electricity amount d3 is the same as the first electricity amount d1. The third electricity amount d3 is a value at which the cooling medium supplying device 104 is able to feed a liquid at the third amount per unit time. Further, the third amount is an amount of liquid supplied which is capable of making the temperature of the molds 4, 6A equal to the target temperature for solidifying a resin during the injection period P2. The third amount of the liquid is a known value depending on physical properties of the first resin, structures and physical properties, and so on, of the molds 4, 6A or by a preliminary experiment.

At the fourth time point t4, the controller 200 starts to supply electricity in the third electricity amount d3 to the flow rate adjusting device 160 (pump) from a predetermined power source (driving source). The cooling medium supplying device 104 allows the amount of liquid supplied per unit time to change depending on the third electricity amount d3 of the supplied electricity.

For example, when an amount of electricity supplied to the flow rate adjusting device 160 is changed, there is a possibility that it takes time before the cooling medium supplying device 104 allows the amount of liquid supplied per unit time to change from the second amount to the third amount (target value), or it takes time before the temperature of the liquid to be supplied reaches the target temperature. That is, a time lag may occur by the time the state of the liquid to be supplied changes into a target state. Further, when electricity supplied to the electric heaters 74, 76A is halted during the preparation period P1, immediately after the electricity supply is halted, a time lag may occur such as a continuous increase in temperature of the molds 4, 6A and failure in an immediate decrease in temperature. That is, when the preparation period P1 is shifted to the injection period P2, a time lag may occur by the time the state of the molds 4, 6A change into a target state or by the time the state of the liquid to be supplied changes into a target state. Therefore, with the time lag taken into account, timing (fourth time point t4) is set for starting a predetermined procedure for decreasing the temperature of the liquid in the internal flow channels 100, 101A, thus making it possible to shift the preparation period P1 to the injection period P2 smoothly in a short time.

In the present embodiment, at the third time point t3, an amount of the liquid supplied per unit time to the internal flow channels 100, 101A reaches the third amount and the molds 4, 6A start to decrease in temperature. Thereby, when the first injection procedure is started, the molds 4, 6A have reached the desired temperature. Further, continuing supply of the liquid makes it possible to decrease the temperature of the molds 4, 6A to the target temperature for solidifying the resin.

In the above-described first embodiment to the third embodiment, the temperature of the liquid during the preparation period P1 is made to be higher than the temperature of the liquid during the injection period P2. Also, the controller 200 is able to make the temperature of the liquid during the preparation period P1 be higher than the temperature of the liquid during the injection period P2. For example, when the amount of liquid supplied per unit time is made to be greater than the amount of liquid supplied per unit time during the injection period P2 with the aim of conducting an operating test of the injection molding machine 10, a procedure for increasing the amount of liquid supplied is carried out at least during a part of the preparation period P1. Thereby, it is possible to provide appropriate measures to suppress the decreased performance of the injection molding machine 10 depending on results of the operating test, while suppressing the decreased productivity of the injection molding machine 10. Further, with the aim of maintaining the injection molding machine 10, it is possible to increase the amount of liquid supplied per unit time during the injection period P2. For example, an increase in the amount of liquid supplied is expected to provide cleaning effects of the supply channel 103i, the internal flow channels 100, 101A, 101B, 102 and so on. Thereby, it is possible to improve the performance of the injection molding machine 10 and decrease the deterioration of the quality of plastic products to be produced. Still further, by taking appropriate measures and carrying out maintenance as described above, the performance of the injection molding machine 10 is maintained. Therefore, it is possible to suppress, for example, an increase in energy used in association with the decreased performance.

In addition, respectively during the preparation period P1 and the injection period P2, a cooling medium is constantly supplied to molds in an appropriate flow rate or at an appropriate temperature to constantly cool the molds. Thereby, an excessive amount of heat given by the electric heaters can be discharged from the molds. Thus, it is possible to obtain a high reproducibility in controlling a temperature of the molds in a molding cycle.

INDUSTRIAL APPLICABILITY

According to the injection molding machine and the injection molding method of the present invention, it is possible to suppress the decreased performance of the injection molding machine and also suppress deterioration in the quality of molded articles.

DESCRIPTION OF THE SYMBOLS

4 . . . Fixed-side mold
5 . . . Movable-side mold
6A . . . Rotating mold
6B . . . Rotating mold
10 . . . Injection molding machine
74 . . . Electric heater
75 . . . Electric heater
76A . . . Electric heater
76B . . . Electric heater 100 . . . Internal flow channel
101A . . . Internal flow channel
101B . . . Internal flow channel
102 . . . Internal flow channel
103i . . . Supply channel
103o . . . Recovery flow channel
104 . . . Cooling medium supplying device
105 . . . Cooling medium recovery device
150 . . . Temperature adjusting device
160 . . . Flow rate adjusting device
170 . . . Electricity supplying device
200 . . . Controller
201 . . . Timer
202 . . . Temperature sensor
300 . . . Seal member
1031i . . . First supply channel
1032i . . . Second supply channel
1031o . . . First recovery flow channel
1032o . . . Second recovery flow channel
CA1 . . . First cavity
CA2 . . . Second cavity
P1 . . . Preparation period
P2 . . . Injection period
t1 . . . First time point
t2 . . . Second time point
t3 . . . Third time point
t4 . . . Fourth time point

The invention claimed is:

1. An injection molding machine comprising:
a mold including a first mold and a second mold which form cavities into which resin is injected;
a liquid supplying device which continuously supplies a liquid to an internal flow channel of the mold during a preparation period prior to injection of the resin and an injection period in which the resin is injected after the preparation period;
an electricity supplying device which supplies electricity to an electric heater arranged on the mold at least during a part of the preparation period, thereby heating the mold;
a controller which carries out a predetermined procedure for changing the temperature of the liquid in the internal flow channel between the preparation period and the injection period; and
a first member which has the first mold connected on a first face thereof and the second mold connected on a second face thereof, and the first member, the first mold and the second mold are configured to rotate.

2. The injection molding machine according to claim 1, further comprising:
a flow rate adjusting device controlled by the controller, the flow rate adjusting device is configured to adjust the amount of liquid supplied per unit time to the internal flow channel, wherein
the predetermined procedure is a procedure for changing the amount of liquid supplied between the preparation period and the injection period.

3. The injection molding machine according to claim 1, further comprising:
a temperature adjusting device controlled by the controller, the temperature adjusting device is configured to adjust the temperature of the liquid before supplying it to the internal flow channel, wherein
the predetermined procedure is a procedure for changing the temperature of the liquid before supplying it to the internal flow channel between the preparation period and the injection period.

4. The injection molding machine according to claim 1, wherein
the controller makes the temperature of the liquid during the preparation period higher than the temperature of the liquid during the injection period.

5. The injection molding machine according to claim 1, wherein
the controller adjusts the temperature of the liquid in the internal flow channel during the preparation period to be equal to or lower than a boiling point of the liquid, and to be equal to or higher than the target temperature of the mold during the injection period, and
the controller adjusts the temperature of the liquid in the internal flow channel during the injection period to be equal to or lower than the target temperature of the mold during the injection period.

6. The injection molding machine according to claim 5, wherein
the controller adjusts the temperature of the liquid in the internal flow channel during the preparation period to be equal to or lower than the target temperature of the mold during the preparation period, and to be equal to or higher than the target temperature of the mold during the injection period.

7. The injection molding machine according to claim 5, wherein
the target temperature of the mold during the injection period is a temperature at which the resin injected into the cavity can be solidified.

8. The injection molding machine according to claim 1, further comprising:
a temperature sensor configured to detect the temperature of the liquid in the internal flow channel, wherein
the controller carries out the predetermined procedure on the basis of detection results of the temperature sensor.

9. The injection molding machine according to claim 1, further comprising:
a timer configured to measure the time of the preparation period and the injection period, wherein
the controller carries out the predetermined procedure on the basis of measurement results of the timer.

10. The injection molding machine according to claim 1, wherein
the electricity supplying device starts supplying electricity to the electric heater at a first time point during the preparation period, and
the controller starts a predetermined procedure for increasing the temperature of the liquid in the internal flow channel at a second time point prior to the first time point during the preparation period.

11. The injection molding machine according to claim 1, wherein
the electricity supplying device halts electricity supplied to the electric heater at a third time point during the preparation period, and
the controller starts a predetermined procedure for decreasing the temperature of the liquid in the internal flow channel at a fourth time point prior to the third time point during the preparation period.

12. The injection molding machine according to claim 1, further comprising:
a supply channel connected to one end of the internal flow channel and through which a liquid supplied from the liquid supplying device flows, wherein
the supply channel comprises a first supply channel formed inside the first member connected to the mold and a second supply channel formed inside a second member connected to the first member, and the injection molding machine having a seal member which is arranged respectively between the mold and the first member as well as between the first member and the second member, thereby suppressing leakage of the liquid.

13. The injection molding machine according to claim 1, further comprising:
a recovery flow channel connected to the other end of the internal flow channel and through which a liquid discharged from the internal flow channel flows, wherein the recovery flow channel includes a first recovery flow channel formed inside the first member connected to the mold and a second recovery flow channel formed inside a second member connected to the first member, and the injection molding machine having a seal member which is arranged respectively between the mold and the first member as well as between the first member and the second member, thereby suppressing leakage of the liquid.

14. The injection molding machine according to claim 13, wherein
the second member is configured to rotate.

15. The injection molding machine according to claim 14, further comprising:
a third mold arranged on one side with respect to the first member; and
a fourth mold arranged on the other side with respect to the first member; wherein the first member rotates, thereby allowing one of the first mold and the second mold to oppose the third mold and also allowing the other of the first mold and the second mold to oppose the fourth mold.

16. The injection molding machine according to claim 15, wherein
a first cavity into which a first resin is injected is formed between one of the first mold and the second mold, and the third mold, and a second cavity into which a second resin is injected is formed between the other of the first mold and the second mold, and the fourth mold.

17. The injection molding machine according to claim 15, wherein
the controller separately controls electricity supplied from the electricity supplying device to the respective electric heaters arranged on the first mold, the second mold, the third mold and the fourth mold in such a manner that the first mold, the second mold, the third mold and the fourth mold will reach the target temperature at the same timing.

18. The injection molding machine according to claim 15, wherein
the controller separately controls an amount of liquid supplied from the liquid supplying device to the respective internal flow channels of the first mold, the second mold, the third mold and the fourth mold in such a manner that the first mold, the second mold, the third mold and the fourth mold will reach the target temperature at the same timing.

* * * * *